(12) United States Patent
Dodeja et al.

(10) Patent No.: US 10,380,218 B2
(45) Date of Patent: Aug. 13, 2019

(54) SERVER-SIDE ACCESS FILTERS FOR WEB CONTENT

(71) Applicant: Oracle International Corporation, Redwood Shores, CA (US)

(72) Inventors: Prakash Dodeja, Fremont, CA (US); Eric Tarasoff, Petaluma, CA (US); Donald Joseph Bircher, Pickerington, OH (US); Tomasz Pęczek, Golkowice (PL)

(73) Assignee: Oracle International Corporation, Redwood Shores, CA (US)

( * ) Notice: Subject to any disclaimer, the term of this patent is extended or adjusted under 35 U.S.C. 154(b) by 87 days.

(21) Appl. No.: 15/071,480

(22) Filed: Mar. 16, 2016

(65) Prior Publication Data
US 2017/0270085 A1     Sep. 21, 2017

(51) Int. Cl.
*G06F 17/00*     (2019.01)
*G06F 16/958*    (2019.01)
*G06F 17/21*     (2006.01)

(52) U.S. Cl.
CPC .......... *G06F 16/986* (2019.01); *G06F 17/218* (2013.01)

(58) Field of Classification Search
CPC .............. G06F 17/2247; G06F 17/227; G06F 17/30905; H04L 63/102
See application file for complete search history.

(56) References Cited

U.S. PATENT DOCUMENTS

| | | | | |
|---|---|---|---|---|
| 6,605,120 B1* | 8/2003 | Fields | ............... | G06F 17/30867 707/E17.109 |
| 8,689,117 B1* | 4/2014 | Vasilik | ............... | G06F 17/30905 715/229 |
| 2002/0087616 A1* | 7/2002 | Garsoe | ............... | G06F 17/3089 709/201 |
| 2009/0300483 A1* | 12/2009 | Viet | ............... | G06F 17/2247 715/236 |
| 2012/0179787 A1* | 7/2012 | Walsh | ............... | H04L 63/0281 709/219 |
| 2014/0366158 A1* | 12/2014 | Han | ............... | G06F 21/32 726/28 |

(Continued)

OTHER PUBLICATIONS

Special Edition Using Corel WordPerfect 10, By Laura Acklen, Read Gilgen; Publisher Que; Publication Date Dec. 13, 2013; pp. 41-42.*

(Continued)

*Primary Examiner* — Scott T Baderman
*Assistant Examiner* — Barbara M Level
(74) *Attorney, Agent, or Firm* — Kraguljac Law Group, LLC

(57) ABSTRACT

A method of filtering web content may include receiving a request from a client device for code for displaying web content. The request may be associated with one or more attributes. The method may also include identifying a section of the code that is enclosed by a set of tags that specify requirements for accessing the section of the code. The method may additionally include determining that the one or more attributes associated with the request do not meet the requirements for accessing the section of the code. The method may further include sending the code for displaying the web content to the client device with the section of the code enclosed by the set of tags removed.

20 Claims, 19 Drawing Sheets

(56) References Cited

U.S. PATENT DOCUMENTS

2016/0004977 A1* 1/2016 Shi ..................... G06Q 20/123
706/12

OTHER PUBLICATIONS

WYSIWYG From Wikipedia, retrieved from https://en.wikipedia.org/wiki/WYSIWYG, archived Mar. 15, 2016, 6 pages.*

* cited by examiner

SERVER-SIDE ACCESS FILTERS FOR WEB CONTENT

BACKGROUND

Both inside and outside of the Enterprise software environment, protecting web content and controlling who is able to access web content is paramount to maintaining website security. Traditionally, content available over the web is protected at the domain level or document level. When a web server receives a request for web content, the web server can check the credentials (e.g., domain login) of the requesting user and determine whether access should be allowed to the web domain. When a user is not allowed to access the web domain, the web server can respond with a HyperText Markup Language (HTML) error code, such as "Error 403—Access Denied." Thus, in order to protect content within a document, the web server must deny access to the entire document.

BRIEF SUMMARY

In some embodiments, a method of filtering web content may include receiving a request from a client device for code for displaying web content. The request may be associated with one or more attributes. The method may also include identifying a section of the code that is enclosed by a set of tags that specify requirements for accessing the section of the code. The method may additionally include determining that the one or more attributes associated with the request do not meet the requirements for accessing the section of the code. The method may further include sending the code for displaying the web content to the client device with the section of the code enclosed by the set of tags removed.

In some embodiments, a non-transitory computer-readable medium may be presented. The computer-readable memory may comprise a sequence of instructions which, when executed by one or more processors, may cause the one or more processors to perform operations including receiving a request from a client device for code for displaying web content. The request may be associated with one or more attributes. The operations may also include identifying a section of the code that is enclosed by a set of tags that specify requirements for accessing the section of the code. The operations may additionally include determining that the one or more attributes associated with the request do not meet the requirements for accessing the section of the code. The operations may further include sending the code for displaying the web content to the client device with the section of the code enclosed by the set of tags removed.

In some embodiments, a system may be presented. The system may include one or more processors and one or more memory devices. The one or more memory devices may comprise instructions that, when executed by the one or more processors, may cause the one or more processors to perform operations including receiving a request from a client device for code for displaying web content. The request may be associated with one or more attributes. The operations may also include identifying a section of the code that is enclosed by a set of tags that specify requirements for accessing the section of the code. The operations may additionally include determining that the one or more attributes associated with the request do not meet the requirements for accessing the section of the code. The operations may further include sending the code for displaying the web content to the client device with the section of the code enclosed by the set of tags removed.

In each embodiment, one or more of the following features may be included in any combination and without limitation. The method/operations may also include receiving a second request from a second client device for the code for displaying the web content, where the second request may be associated with second one or more attributes; determining that the second one or more attributes associated with the second request do meet the requirements for accessing the section of the code; and sending the code for displaying the web content to the second client device with the section of the code enclosed by the set of tags. The method/operations may also include, prior to receiving the request, displaying the web content in a web design interface, receiving a selection of the section of the code through the web design interface, receiving the requirements for accessing the section of the code through the web design interface, and automatically inserting the set of tags around the section of the code. The section of the code may include a reference to a dynamic widget. The section of the code may include text to be displayed as part of the web content. The set of tags may include HyperText Markup Language (HTML) tags. The method/operations may also include identifying a second section of the code that is enclosed by a second set of tags that specify second requirements for accessing the second section of the code, where the section of the code is also enclosed by the set of tags; and determining that the one or more attributes associated with the request do meet the second requirements for accessing the second section of the code, wherein the code for displaying the web content is send to the client device with the second section of the code. The method/operations may also include removing the set of tags before the code for displaying the web content is sent to the client device. The one or more attributes associated with the request may include a user group to which a user of the client device belongs. The one or more attributes associated with the request may include a geographic location from which the request is received. The one or more attributes associated with the request may include security attributes assigned to a user of the client device.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
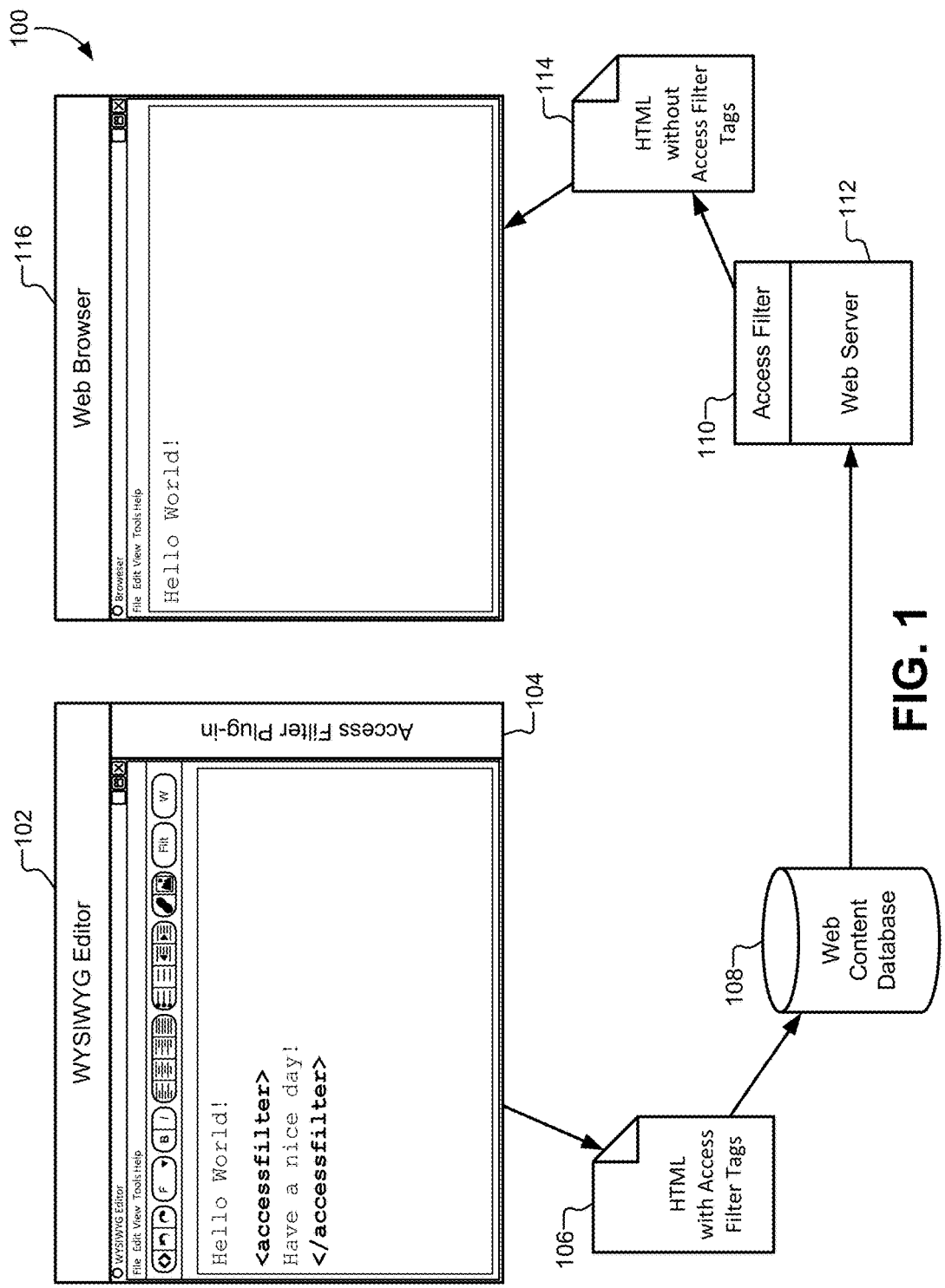
FIG. 1 illustrates a simplified block diagram of a system for providing server-side content filters, according to some embodiments.

Described herein are embodiments for applying a fine-grained access filter to both static and dynamic content in webpages. An editor in a Content Management System (CMS) can be designed to allow webpage designers to graphically select content for access filtering. The CMS interface can display filtered content inside of a graphical container that visually separates the filtered content from the unfiltered content. In the underlying webpage code, the filtered content can be automatically enclosed in a set of tags defining an access filter region. The tags not only separate filtered content from unfiltered content, but they also link the filtered content to a particular access filter definition. The access filter definition may include users or groups that are allowed to view the filtered content, or may specify other attribute requirements related to the user, the client device, the session, the geographic location of the user, and so forth. The webpage code may be stored in a web content database with both the filtered content and the access filter tags embedded therein. When a user requests a webpage with access filters, the web server performs a filtering function before the webpage is delivered to the user. The web server identifies any access filters stored in the webpage, and then determines whether the user is allowed to access the filtered content according to the access filter definition. If the user is allowed to access the content, the access filter tags are removed and the webpage is delivered with the filtered content being indistinguishable from the unfiltered content.

On the other hand, if the user is not allowed to access the content, the server removes the access filter tags and any content enclosed by the tags from the webpage. When user receives the filtered webpage, there is nothing to indicate that content has been removed by the server. Complex filter designs are also possible, including tags with multiple filters and nested filter hierarchies.

Web designers often want to tailor content that is delivered to users based on attributes. In the security context, certain content types may only be available to certain groups of users. In other contexts, it may be desirable to dynamically tailor web content based on the user's location, identified interests, group memberships, and so forth. Prior to this disclosure, content designers who wished for certain types of content or functionality to only be accessible to certain users had no easy solution. Typically, content filtering problems like this were solved through the use of separate pages, extensive configuration and security group settings, and complex website hierarchies. Besides being cumbersome and error-prone, these types of solutions often lacked the level of granularity and control necessary to fine-tune the appearance and functionality of a webpage. Specifically, there was no way to make a single sentence of text, picture, or widget only visible and/or active for certain users and/or situations.

FIG. 1 illustrates a simplified block diagram 100 of a system for providing server-side content filters, according to some embodiments. When a webpage is designed by a human web designer, a CMS webpage editor 102 may present at least two different views to the web designer. A first view depicted in FIG. 1 can show the underlying webpage code that is interpreted by a web browser in order to display the visible webpage content to the user. A second view, often termed a "what you see is what you get" (WYSIWYG) view, can display the content (text and graphics) in a form closely corresponding to its appearance when printed or displayed in a web browser. As will be described in further detail below, a web designer can graphically select and edit content in the WYSIWYG view of the editor 102. This selection can be used to automatically place a set of access filter tags around the code for the selected content in the code view of the editor 102. The editor 102 may include an access filter plug-in 104 that adds this functionality to an existing editor 102.

Once the access filters have been added to the webpage in the editor 102, the code for the webpage 106 can be stored in a web content database 108. The web content database 108 may include websites for one or more web domains. For example, in an Enterprise context, the web content database 108 may include webpages for various Enterprise groups, such as human resources, customer service, inventory management, purchasing, and so forth.

A web server 112 may receive requests from client devices for content stored in the web content database 108. For example, a user may operate a web browser 116 on his/her client device and request a webpage containing access filters from the web server 112. An access filter process 110 may operate on the web server 112 to perform the access filtering function. Specifically, the access filter process 110 may receive attributes associated with the user or his/her client device, such as user credentials, hardware keys, group memberships, and/or the like. In some embodiments, the access filter 110 may access an enterprise Identity Management System (IMS) to request security attributes for the user. These attributes may then be compared to the requirements of each access filter referenced in the requested webpage. The access filter process 110 can determine whether the requirements of each access filter are met by the attributes of the user. If the requirements are not met, then the content enclosed within the access filter tags of the requested webpage can be removed along with the access filter tags themselves.

After the filtering process is complete, the code for the webpage 114 can be sent to the web browser 116. The filtering solution provided by this disclosure is compatible with any web browser 116 used by the client device. Specifically, implementing, designing, and inserting access filters into a webpage are done at design time in the CMS webpage editor 102. The actual filtering operation is performed by the web server 112 when a webpage is requested by a user. Therefore, the entire filtering operation is entirely transparent to the user's web browser 116. No cumbersome plug-ins or JavaScript need to operate on the user's web browser 116. Additionally, because the filtered content is removed before it is sent to the user's web browser 116, there is no way for the user to intercept unfiltered content or override filtering operations at the client device.

Figure 2:
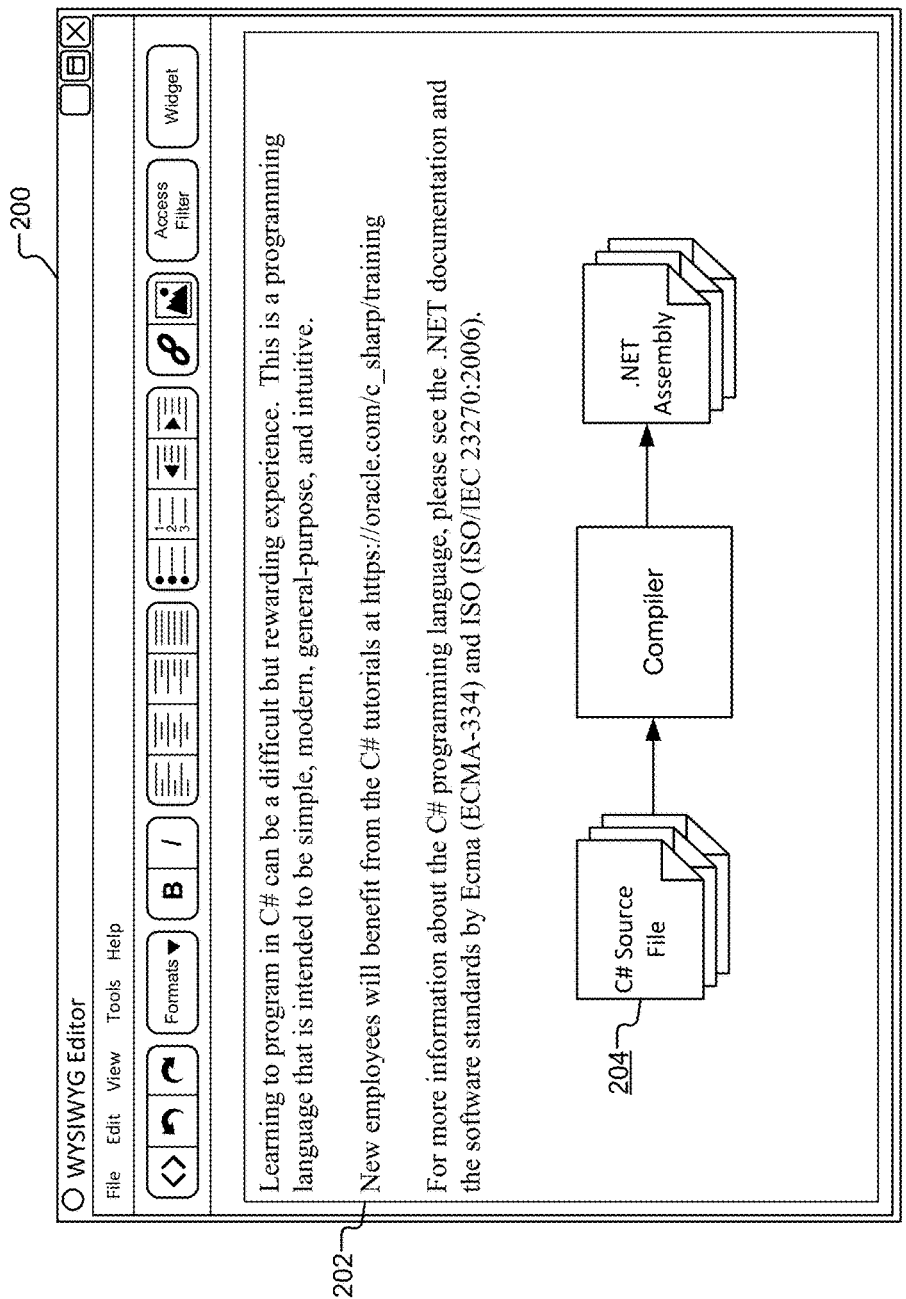
FIG. 2 illustrates a web content design interface displaying content as it will be viewed by a web browser, according to some embodiments.

FIG. 2 illustrates a webpage editor 200 displaying content as it will be viewed by a web browser, according to some embodiments. In this view, editor 200 has rendered the website code to be displayed as would be seen on a user's browser. As used herein, this view will be referred to as a "standard" view. The editor 200 includes standard menu buttons for formatting text, images, and controls that are part of the webpage. In this specific example, editor 200 includes three paragraphs of plain text 202 and a graphic image 204.

Figure 3:
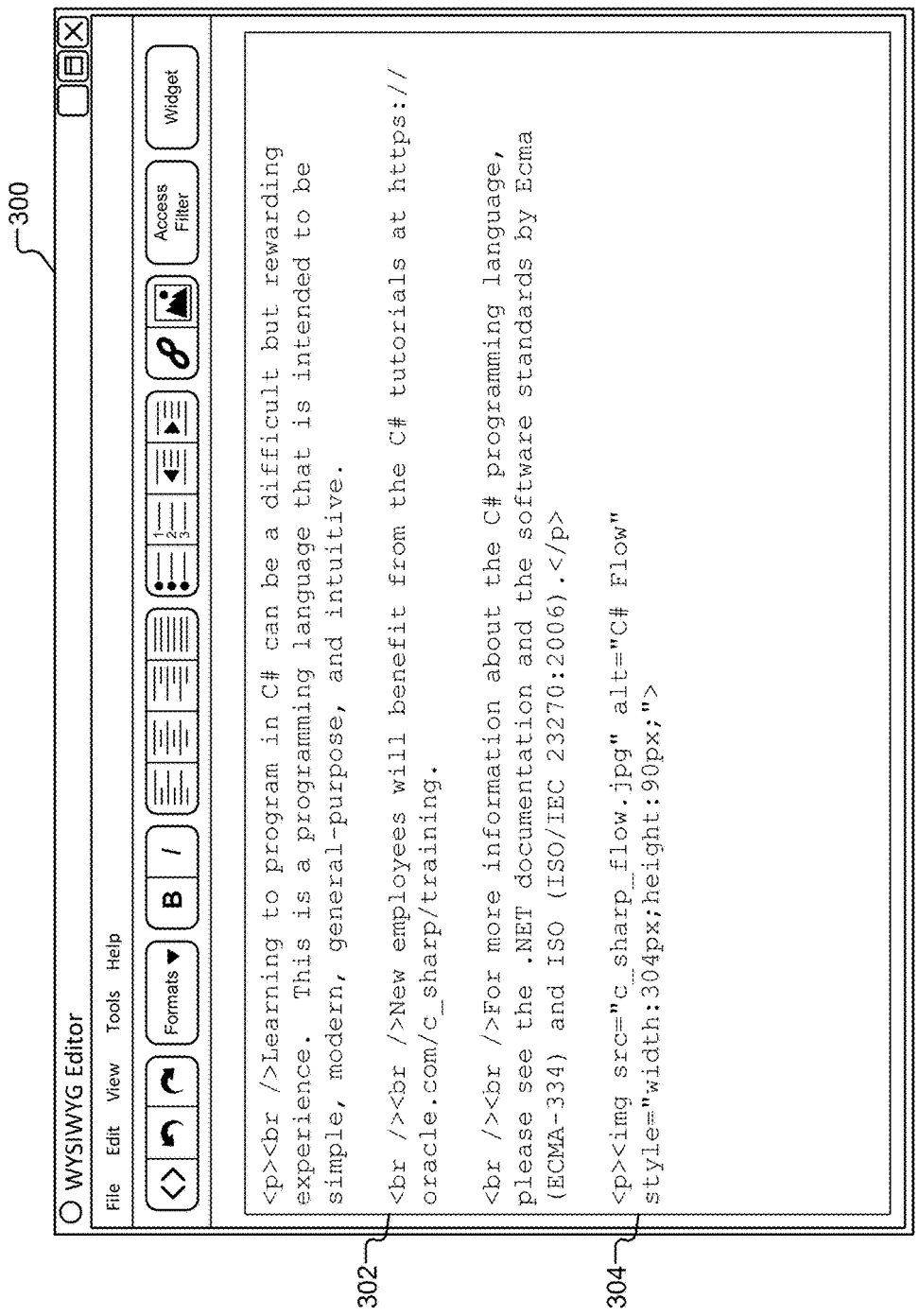
FIG. 3 illustrates a design interface displaying code for generating a webpage, according to some embodiments.

FIG. 3 illustrates a webpage editor 300 displaying code for generating a webpage, according to some embodiments. In this view, editor 300 displays the raw code—HTML in this case—that will be received by a web browser and used to render the webpage. As used herein, this view will be referred to as a "code" view. The three paragraphs of plaintext 202 in FIG. 2 are generated by the three code statements 302 inside the <p> </p> tags. Similarly, the graphic image 204 of FIG. 2 is generated using the code statement 304 inside the <img> tag. Webpage code can be enclosed within tags in order to apply certain properties to the enclosed code. The tags are not displayed as part of the webpage in the standard view, but instead provide instructions for the web browser on how to render the enclosed webpage code. When the webpage is displayed, the tags are parsed by the web browser and removed from the text that is displayed on the screen. In order to describe embodiments of the present invention, the standard view of FIG. 2 and the code view of FIG. 3 will be referenced in the subsequent figures.

Figure 4:
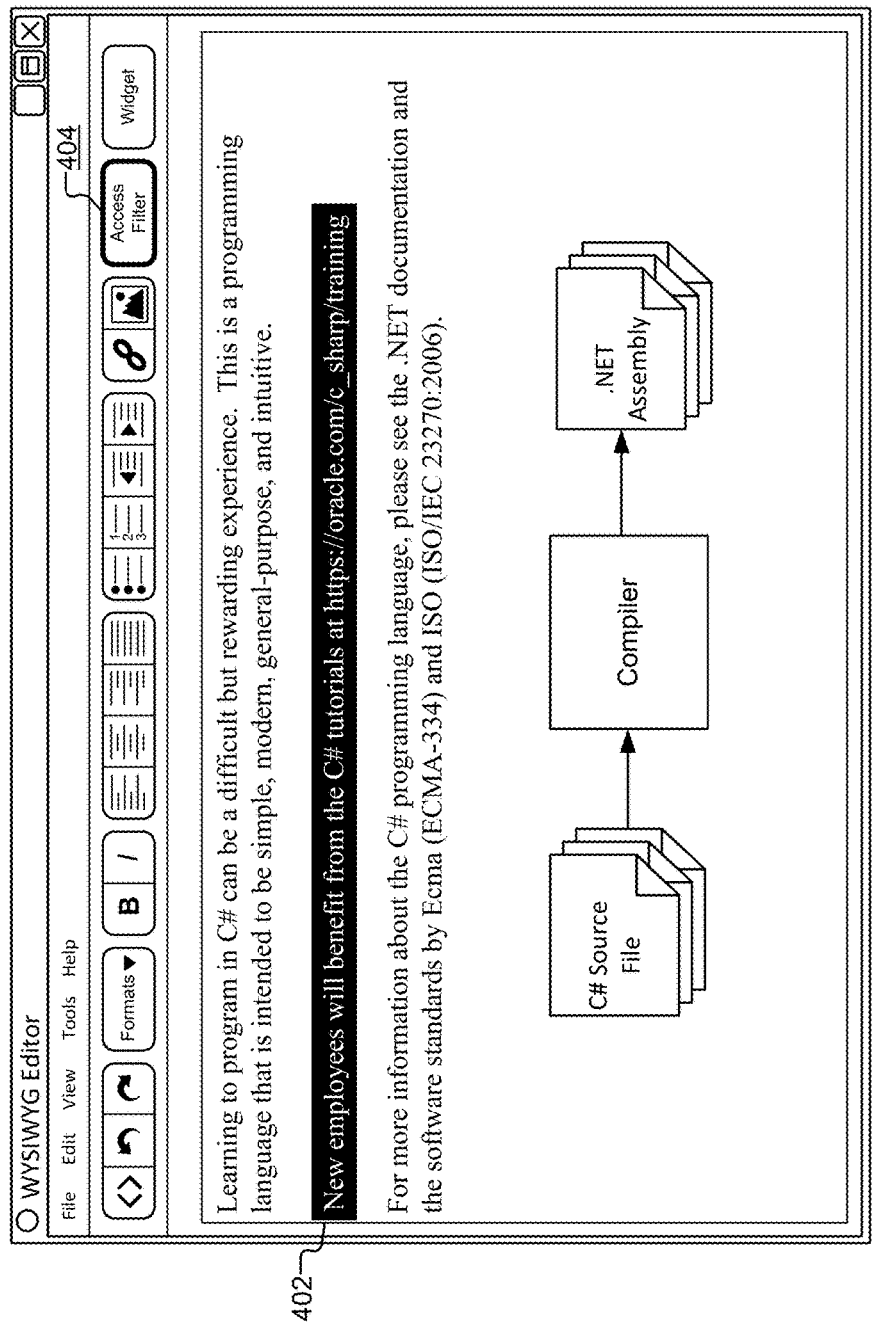
FIG. 4 illustrates a selection of content to be access controlled using a server-side filter, according to some embodiments.

FIG. 4 illustrates a selection of content to be access controlled using a server-side filter, according to some embodiments. Turning back to the standard view of the exemplary webpage editor, users may be able to graphically select displayed content in order to add an access filter. For example, text selection 402 may be highlighted using keyboard or mouse inputs from a user and graphically differentiated from other text and/or content in the browser. The access filter plug-in of the browser can configure the browser to display an access filter button 404 in a menu area of the editor. After selecting the text selection 402, the user can click the access filter button 404 in order to begin the process of generating an access filter. In this example, the user may wish to hide the text selection 402 from some groups of users, while allowing other groups of users to view the text selection 402. For example, because text selection 402 displays information that may only be useful for new employees, an access filter can be set up that hides the text selection 402 from everyone except new employees.

Figure 5:
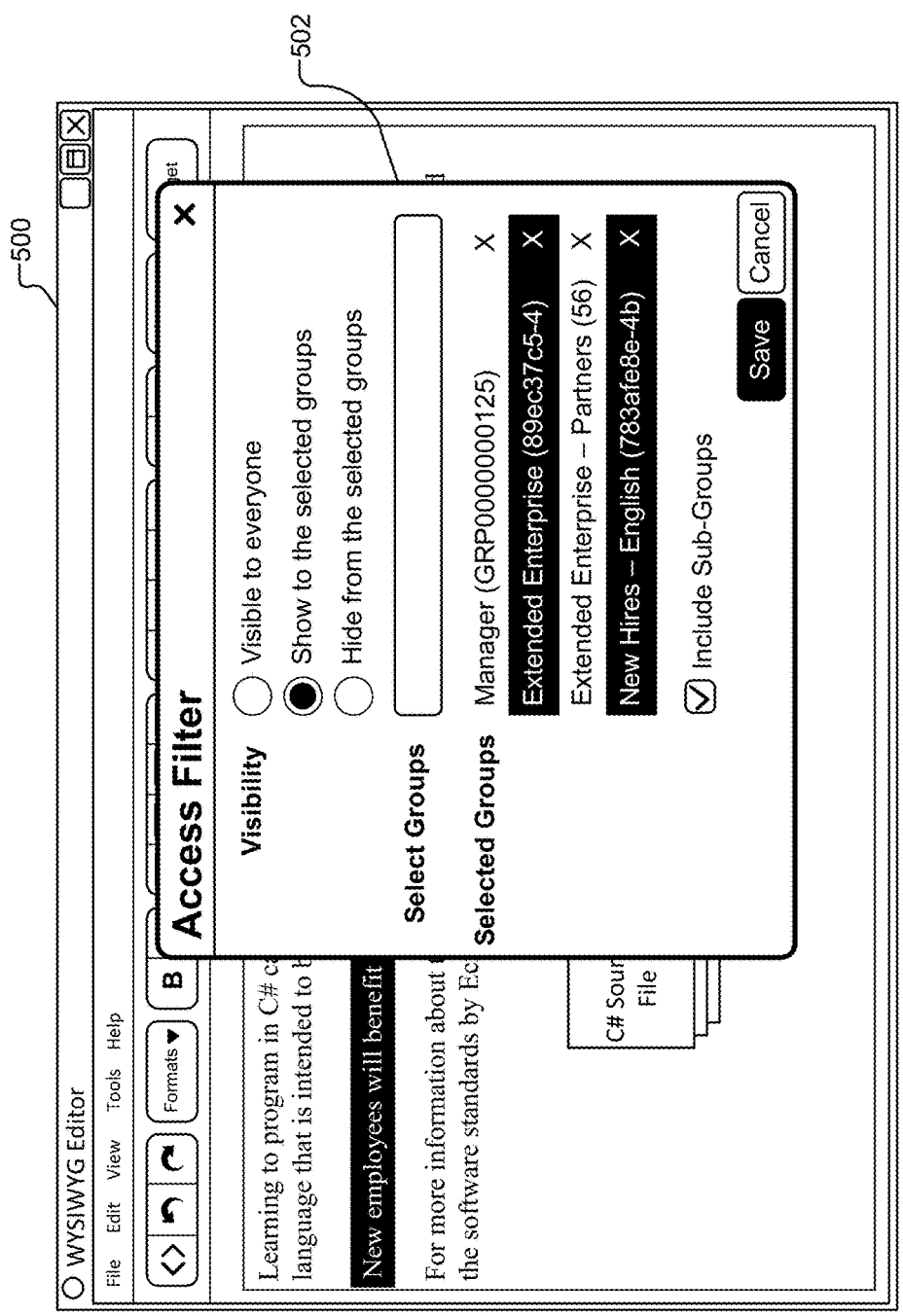
FIG. 5 illustrates an interface for defining an access filter, according to some embodiments.

FIG. 5 illustrates an interface 502 for defining an access filter, according to some embodiments. After selecting the access filter button 404 in FIG. 4, interface 502 may be displayed as a modal or nonmodal window on top of the standard view of the editor. Interface 502 can be used to define the requirements of the access filter. It will be understood that the specific access filter definitions will vary depending on the particular embodiment and the needs of the organization implementing the access filters. Therefore, the input fields of interface 502 are merely exemplary and not meant to be limiting. In this example, the filter definition is based on group memberships of individual users. Interface 502 includes textual and graphical controls that allow a webpage designer to select groups of individuals that can be filtered by the access filter. The webpage designer can specify that users falling within one or more of the selected groups will either be allowed to see the content within the access filter (i.e., white listed), or will be prevented from seeing the content within the access filter (i.e., black listed). This embodiment also includes an option for the information in the access filter to be visible to everyone. This may allow a webpage designer to place content within an access filter, define groups/requirements for the access filter, and then decide whether or not to activate the access filter by selecting one of the three visibility options.

In other embodiments not shown explicitly in FIG. 5, different methods of selecting and/or defining access filters may be provided. In some embodiments, a list of predefined access filters may be displayed for a user to choose from. For example, the access filter defined in interface 502 can be saved, given a name, and reused in the future. In some embodiments, access filters may include Boolean or logical expressions that combine or test various attributes of individual users or groups. For example, some access filters may compare an Access Control List (ACL) to an authenticated identity of a user. Some access filters may compare security attributes of individual users to a list of selected security attributes required by the access filter. In some embodiments, the access filter may utilize attributes of the web session with a client device. For example, access filters may display some information for mobile devices with smaller screens, while displaying alternate information for desktop devices with larger screens. Access filters may also be used to selectively display information based on what browser is being used, what version of a browser is being used, what operating system is being used, and/or a processing power or memory capability of a client device. In some embodiments, access filters may selectively display information based on networks through which the webpage is accessed. For example, content may be selectively filtered for client devices communicating within an Enterprise environment, compared to client devices communicating from outside of the Enterprise environment. Content may be selectively filtered for client devices communicating through traditional ISPs, compared to client devices communicating through wireless device ISPs. In some embodiments, an IP address may be used to identify a geographic location of the client device. In these embodiments, an access filter can selectively filter information based on geographic location, and thereby provide text in alternate languages and other information specific to different geographic regions. In some embodiments, the access filter may reference a stored profile for a user. Such profiles may include interests, hobbies, business affiliations, technical qualifications, job role/titles, browser histories, friends and contacts, and/or the like. The access filter may selectively filter information based on user preferences, thereby emphasizing information on a webpage that is of most interest to each particular user. In some embodiments, any of the access filter types described above may be combined in any combination and without limitation. For example, an access filter may white list members of certain groups and/or organizations, while also providing content in two different languages based on user locations. In another example, an ACL may be used to provide access to content while also limiting some text to be viewed only by new employees. In light of this disclosure, one having skill in the art could effectively use the concepts described above to design many different types of access filters.

Figure 6:
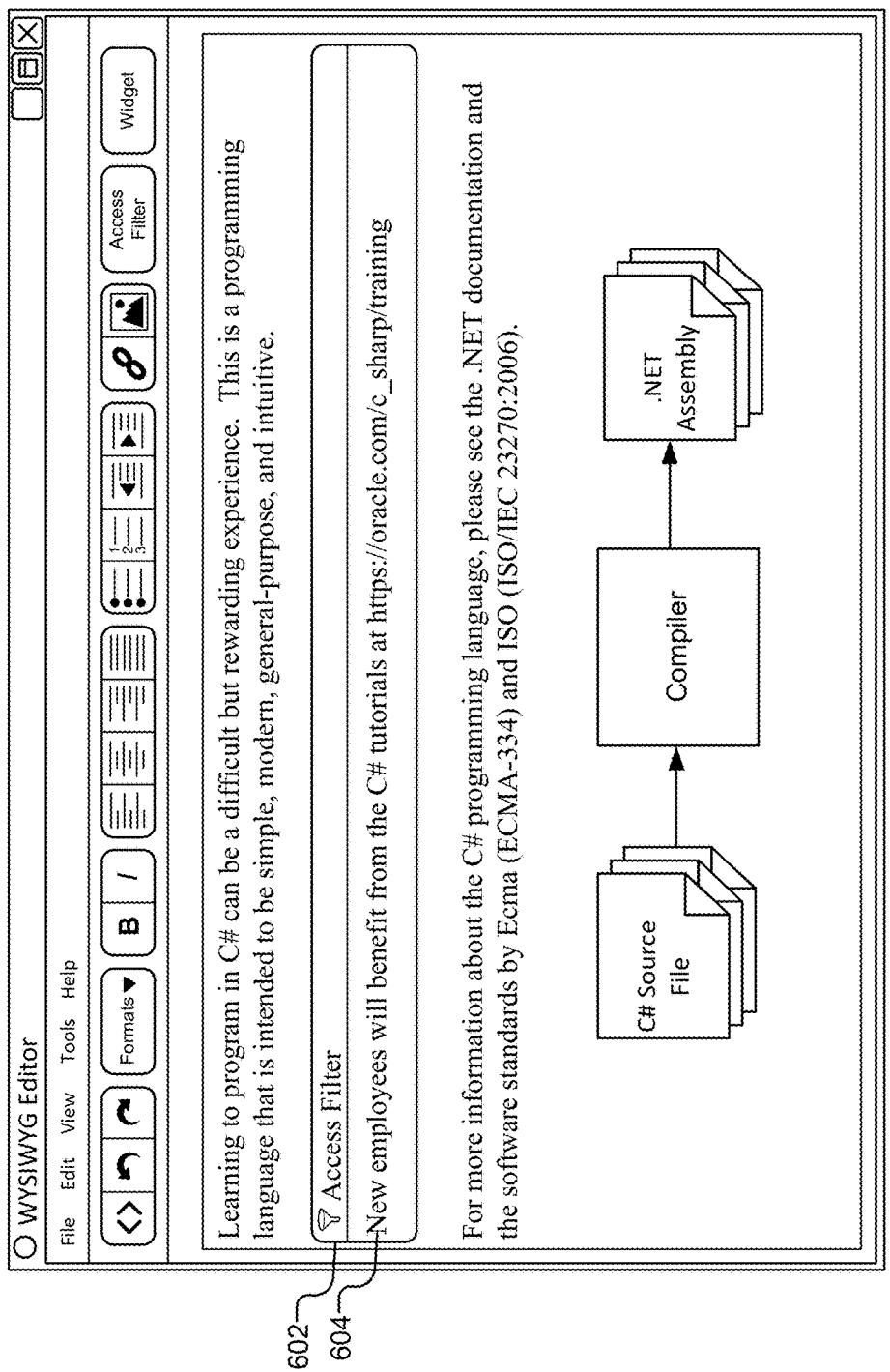
FIG. 6 illustrates an access filter placed around visible content in the webpage, according to some embodiments.

FIG. 6 illustrates an access filter 602 placed around visible content in the Webpage, according to some embodiments. In order to designate content that is protected by an access filter in the standard view of the editor, the access filter plug-in can automatically insert a graphic container around the protected content. In the example of FIG. 6, the access filter 602 encloses the protected content 604 in a graphical container to visually represent the protection by the access filter 602. In some embodiments, the access filter 602 may include a header bar that can give information regarding the access filter. For example, the access filter 602 may display header information that includes an access filter name and/or one or more of the requirements of the access filter (e.g., "new hire group," "North American region," "mobile devices," etc.). Note that the access filter 602 may be visible only in the editor window, and will not be visible when the webpage is render on a user's browser on a client device. As will be described in greater detail below, the access filter process on the web server will remove the access filter tags/graphics and selectively remove the filtered content from the webpage code before it is sent to the user's browser.

Figure 7:
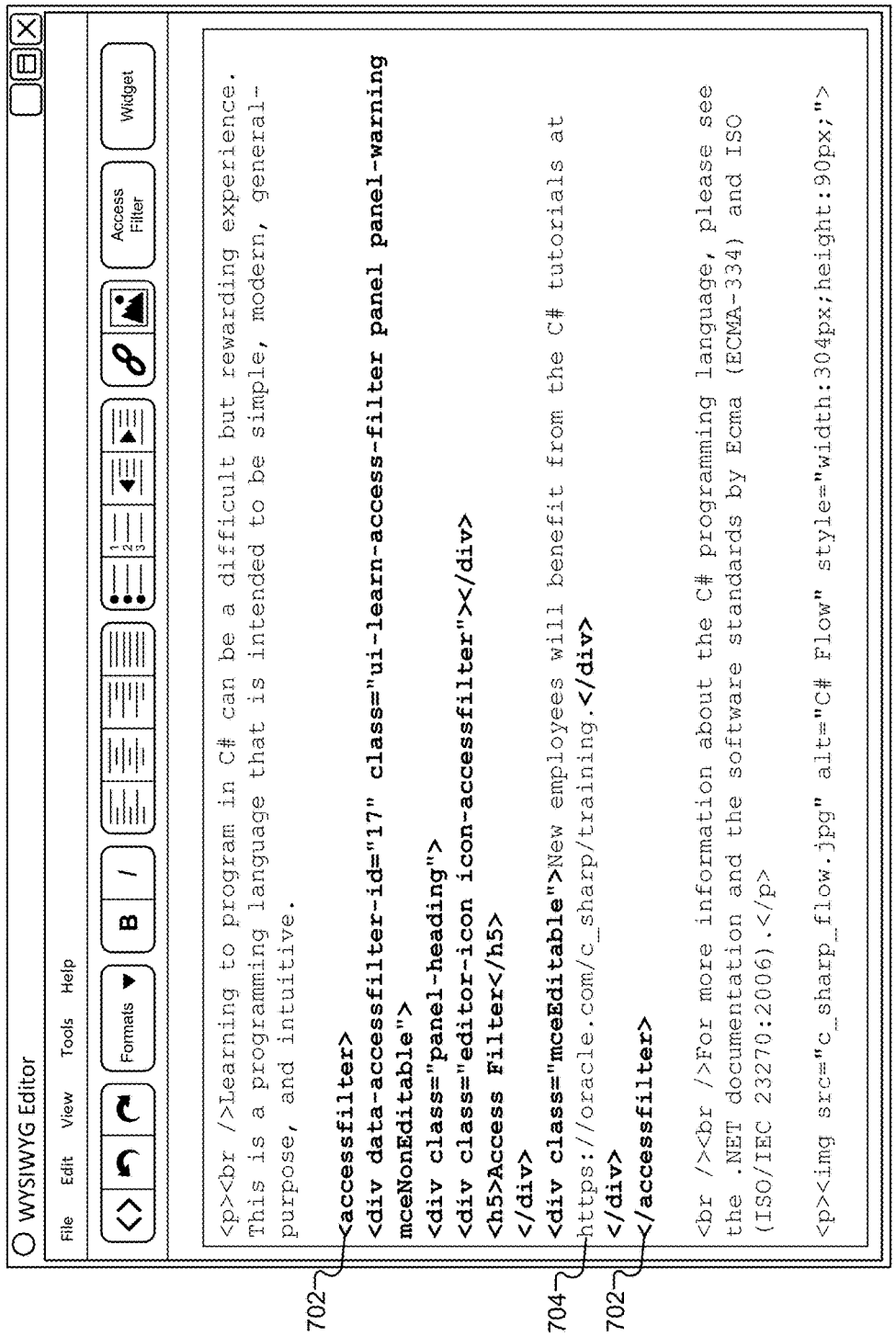
FIG. 7 illustrates a set of tags enclosing code for filtered content, according to some embodiments.

FIG. 7 illustrates a set of tags 702 enclosing code for filtered content 704, according to some embodiments. When the access filter is inserted in the standard view of the editor, changes to the underlying webpage code are automatically made by the access filter plug-in. In this example, instantiating an access filter in the standard view of the editor may have one or more of the following effects to the code view. First, the set of tags 702 may automatically be inserted such that they encompass the code for the filtered content 704. For example, the <accessfilter> </accessfilter> tags are automatically inserted around the code for the filtered content 704. Second, code may be inserted within the set of tags 702 to display the graphical container for the access filter in the standard view. For example, the information in the <div> </div> tags of FIG. 7 can be added to generate the graphical container for the access filter 602 of FIG. 6. Finally, information or attributes can be encapsulated in the set of tags 702 that define or reference the filter requirements defined in the interface 502 of FIG. 5. In some embodiments, the access filters are represented by "div" tags surrounding the content to be filtered. A "data dash" attribute is used to link the div container to an access filter definitions stored on the server. For example, the tag <div data-accessfilter-id="123"> . . . </div> would link the content displayed inside the graphical container of the webpage to access filter number 123 stored in the access filter database.

Although the process described above selects content in the standard view and automatically generates code in the code view, the opposite process may also be used by some embodiments. For example, when the code view is active, the webpage designer can select webpage code and select the access filter button 706. This may generate an access filter design window similar to interface 502 of FIG. 5. Once the access filter is selected/defined, the access filter code, including the set of tags 702, may be automatically inserted into the code view, which in turn will generate the graphical container of the access filter in the standard view.

Figure 8:
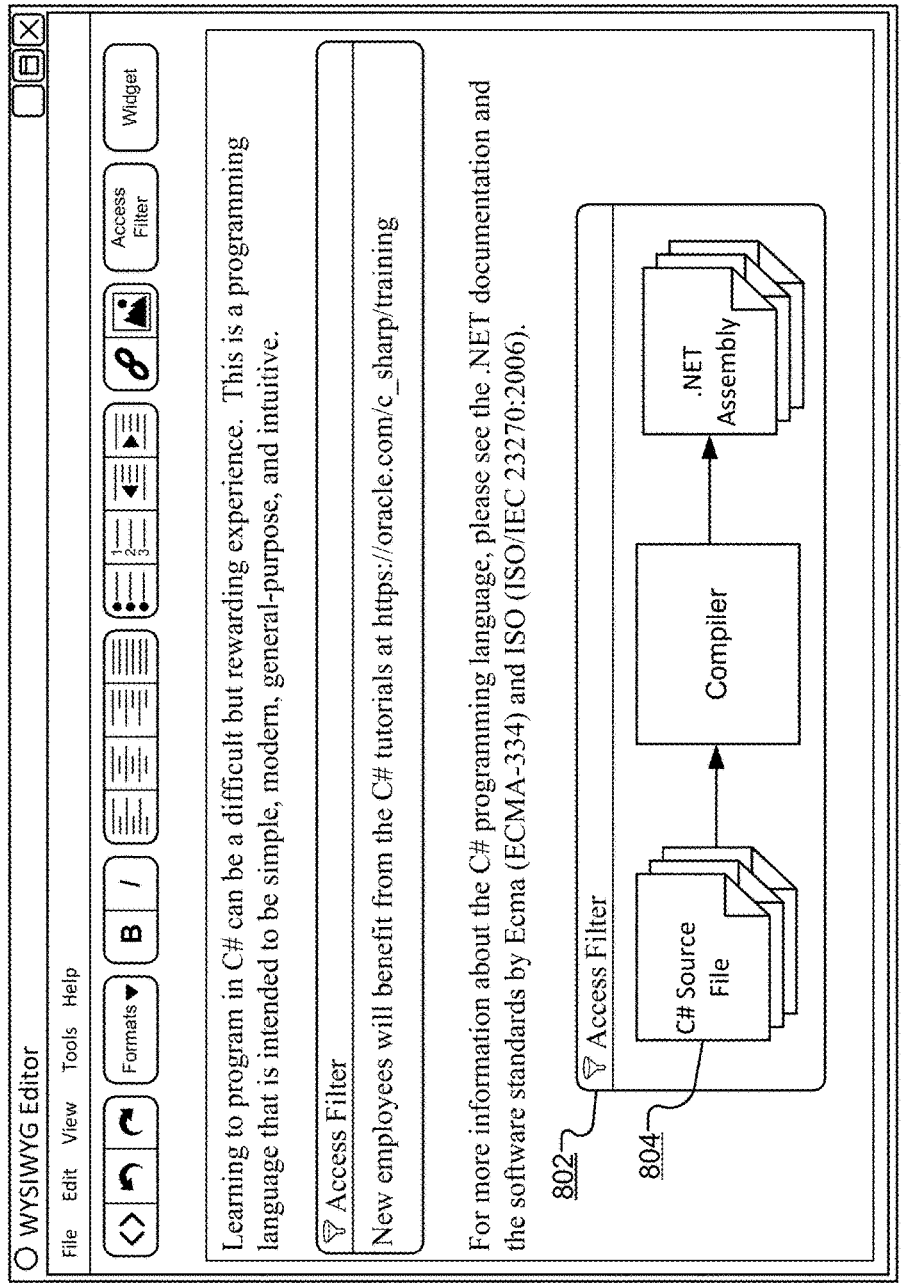
FIG. 8 illustrates an access filter placed around multimedia content in the webpage, according to some embodiments.

FIG. 8 illustrates an access filter 802 placed around multi-media content 804 in the webpage, according to some embodiments. FIG. 8 also illustrates how multiple access filters may be added to a single webpage. The existing access filter around the textual content described above continues to be displayed in the standard view of the editor. Additionally, the standard view displays the access filter 802 placed around multimedia content 804, such as a graphical image. It will be understood that any number of access filters can be individually added to a single webpage. There is no limit to the size of the content to be enclosed in an access filter. For example, single letters or words can be enclosed in an access filter, as well as the entire contents of a webpage.

Figure 9:
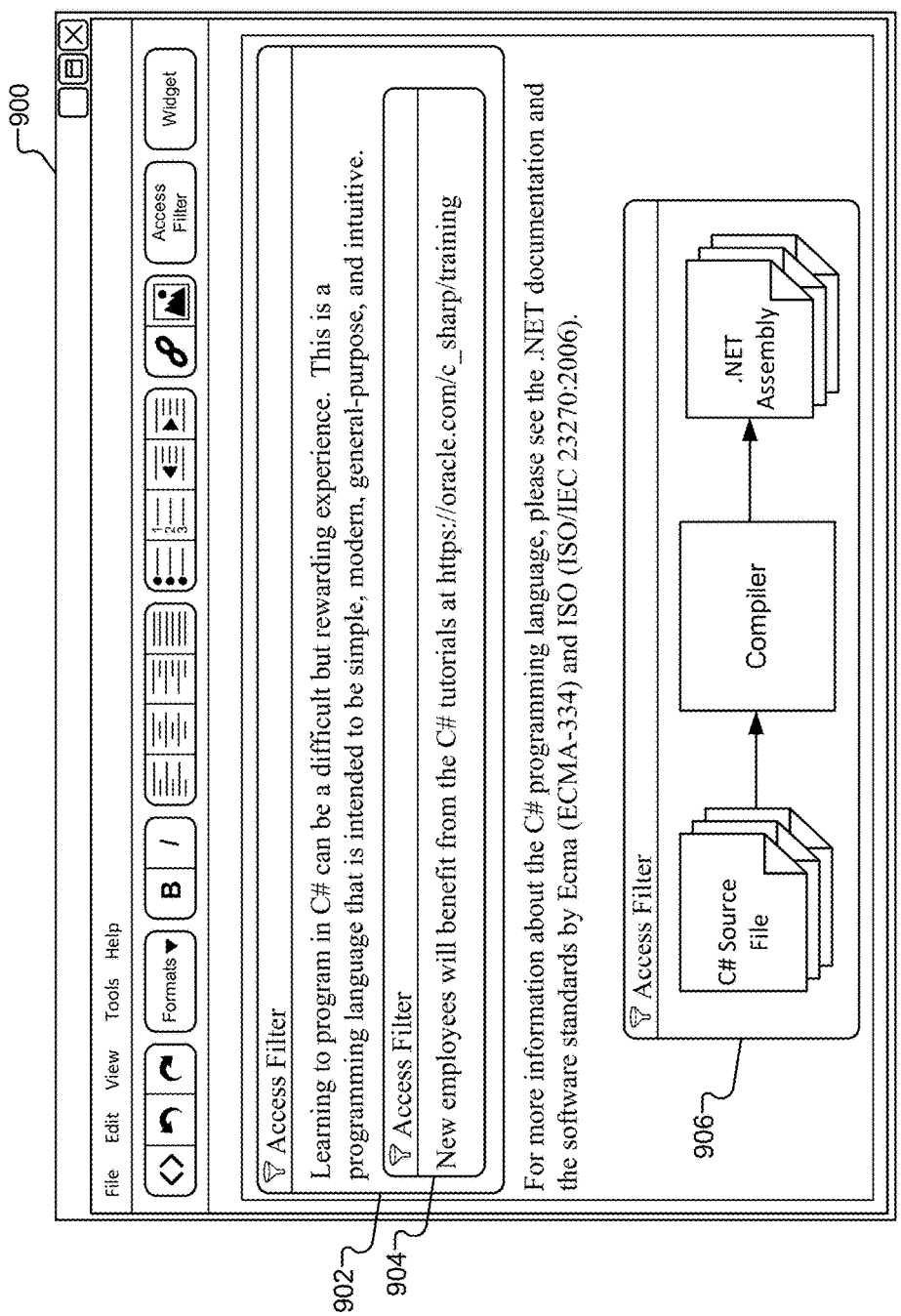
FIG. 9 illustrates nested access filters, according to some embodiments.

FIG. 9 illustrates nested access filters, according to some embodiments. Just as there is no limit to the number of access filters that can be used in a single webpage, there is also no limit to the number of hierarchical levels of nested access filters. In the example of FIG. 9, a first access filter 904 can be placed around a first line of selected text. Next, a second access filter 902 can be placed around the first access filter 904 along with additional selected text. In the code view of the editor, this would result in nested sets of access filter tags in the webpage code.

In evaluating the first access filter 904 and the second access filter 902, the access filters can be evaluated in hierarchical order. In other words, the second access filter 902 can evaluated first. If the user is allowed to view the additional selected text in the second access filter 902, the additional selected text can be displayed and the first access filter 904 can then be similarly evaluated. However, if the user is not allowed to view the additional text in the second access filter 902, the first access filter 904 does not need to be evaluated. Instead, all of the code inside of the set of tags corresponding to the second access filter 902 can be removed from the webpage by the access filter process of the web server.

Figure 10:
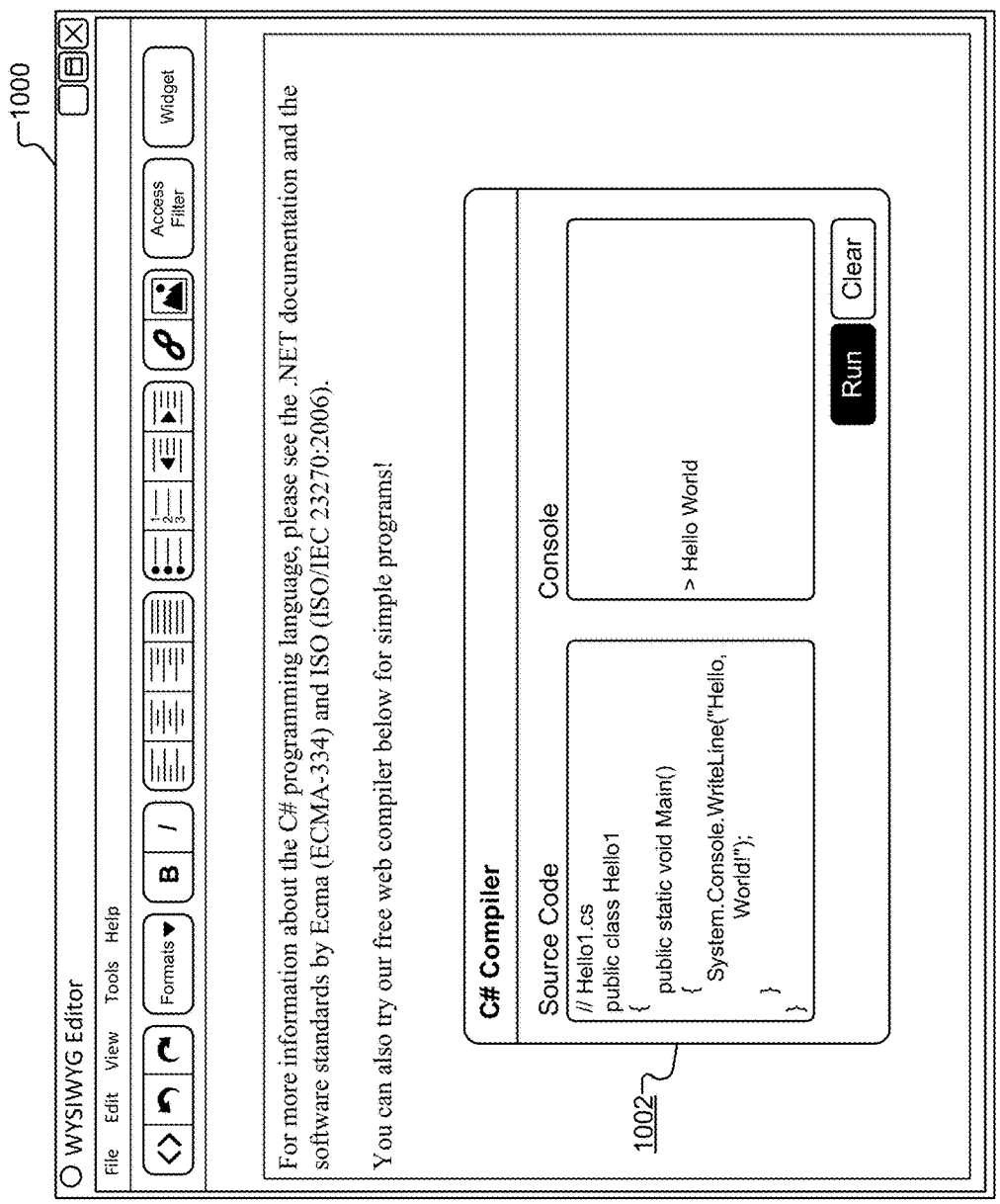
FIG. 10 illustrates dynamic content in a webpage, according to one embodiment.
Figure 11:
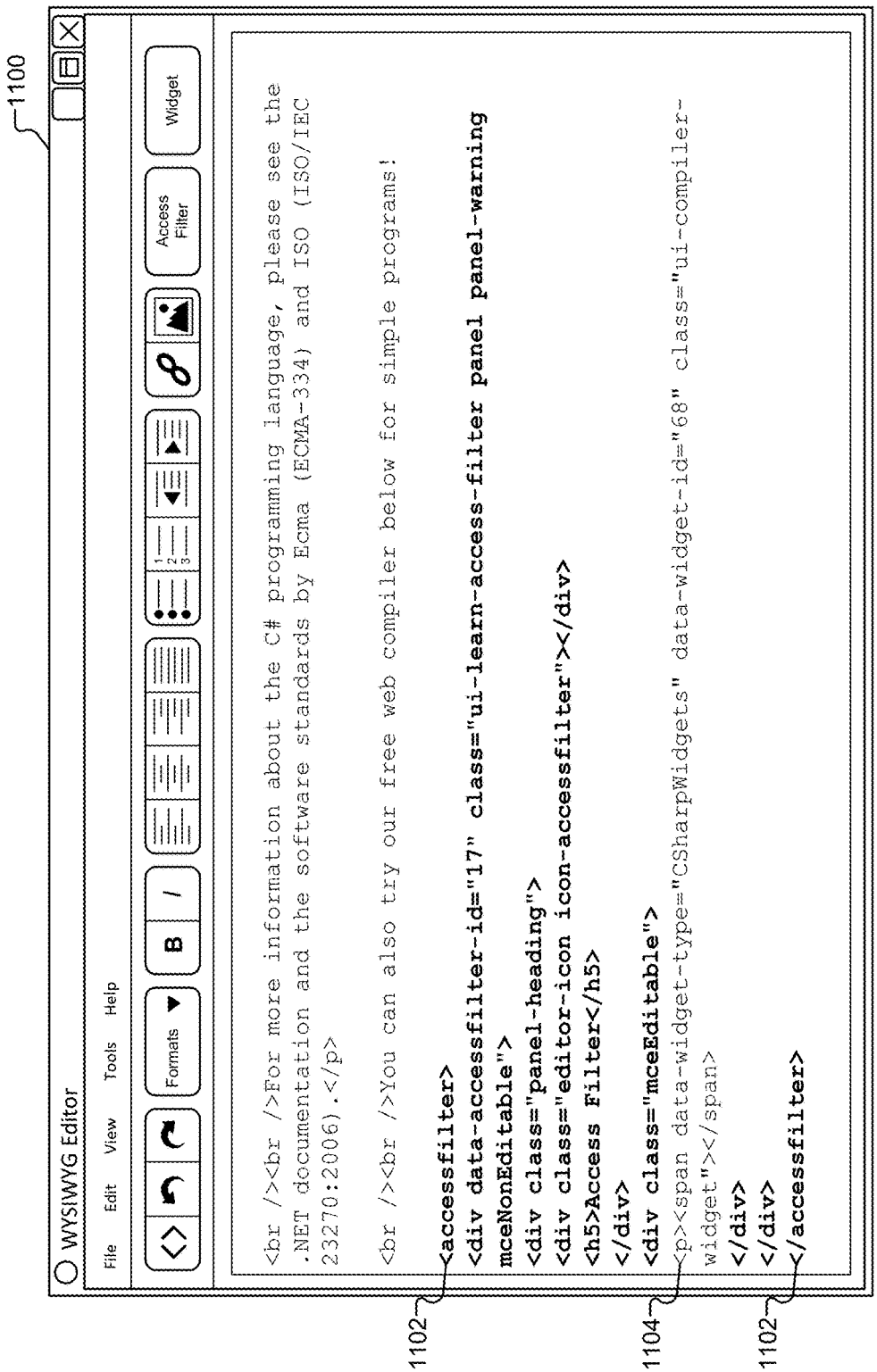
FIG. 11 illustrates code with access filter tags protecting the dynamic content of the webpage, according to one embodiment.
Figure 12:
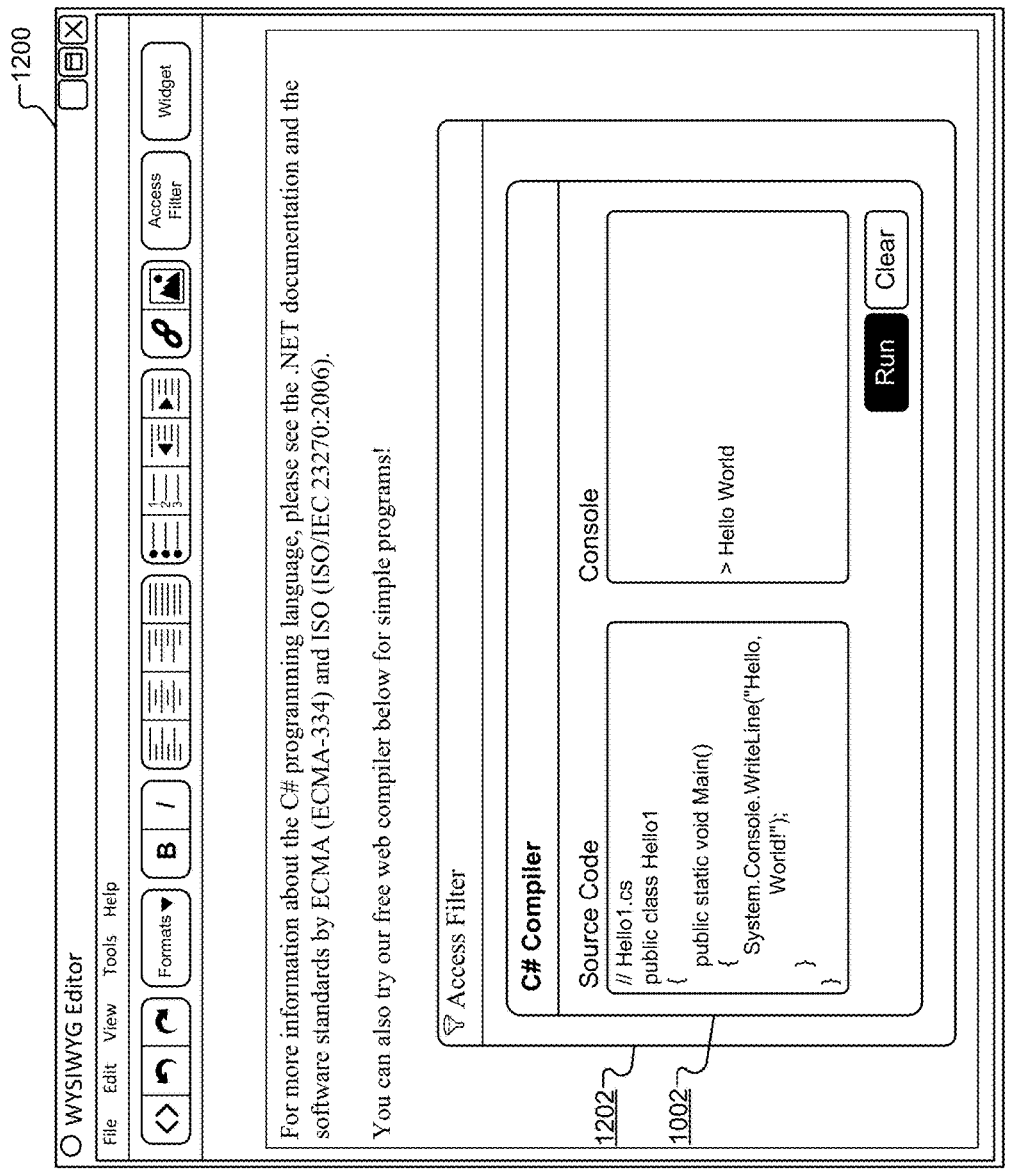
FIG. 12 illustrates an access filter for dynamic content, according to one embodiment.

FIG. 10 illustrates advanced content in a webpage, according to one embodiment. In addition to access filtering static content, such as text and graphic images, the access filters described herein can also be used to filter dynamic content and complex widgets. In the example of FIG. 10, a C# compiler widget 1002 is inserted into a webpage. The C# compiler may allow users to type source code into the left-hand side, while seeing the resulting output on the right-hand side of the C# compiler widget 1002. The website code may include dynamic HTML that inserts the C# compiler widget 1002 when the website is requested using current available C# libraries. Just like static and simple content, the C# compiler widget can be selected by the webpage designer and encapsulated in an access filter. For dynamic content, the server-site scripts that build the webpage at runtime can also be enclosed in access filters that are removed if the users do not meet the requirements of the access filters. FIG. 11 illustrates code with access filter tags protecting the C# compiler widget 1002 of the webpage, according to some embodiments. Note that the set of tags 1102 are placed around the code for the widget 1104 in a manner similar to the previous examples described above. FIG. 12 illustrates an access filter graphical container inserted into the standard view around the C# compiler widget 1002, which is now encapsulated within an access filter container 1202.

Figure 13:
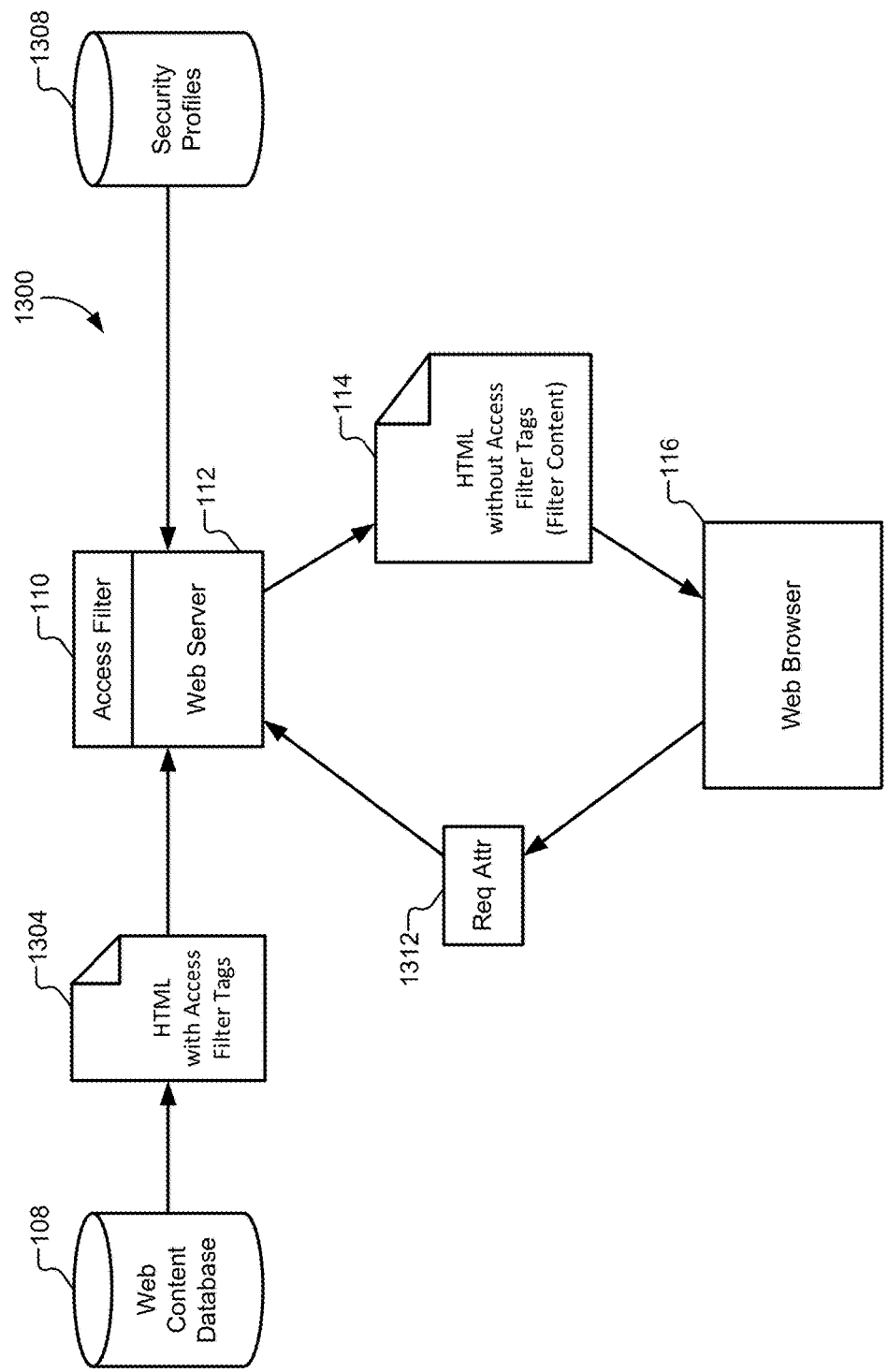
FIG. 13 illustrates a simple block diagram of a system for filtering content for requests received from client devices, according to some embodiments.

FIG. 13 illustrates a simple block diagram 1300 of a system for filtering content for requests received from client devices, according to some embodiments. After the access filters have been defined and placed in the webpage code, the webpage code can be stored in a web content database 108, which provides the webpage code for a web server 112. Note that the webpage code stored in the web content database 108 may include the access filter code described above. When a user requests a webpage from the web server 112 through a web browser 116 running on a client device, the web server 112 can request the webpage (with the access filter tags) 1304 from the web content database 108. The access filter process 110 operating on the web server 112 may receive request attributes 1312. In the embodiment of FIG. 13, the request attributes 1312 may be sent from the user's web browser 116. In other embodiments, the request attributes 1312 may be stored locally on a profile accessible to the web server 112, or may be included as part of the webpage request (e.g., an IP address indicating geographic location). In some embodiments, the access filter process 110 may also query additional user attributes from a local IMS or other comparable system that stores user profiles 1308.

Once the access filter process 110 has the webpage 1304 and the request attributes 1312, the access filter process 110 can begin filtering the content of the webpage. In some embodiments, the access filter process 110 can perform a text search of the webpage 1304 to locate text corresponding to tags indicating an access filter. In the examples above, the access filter process 110 can search the webpage 1304 for instances of "<accessfilter>" text strings. The access filter process 110 can then parse the information enclosed in the access filter tags and determine or look up requirements for each access filter. The requirements of the access filter can then be compared to one or more of the request attributes 1312, and the access filter process 110 can determine whether the requirements of each access filter are met. If the requirements are met, the access filter tags may be removed, and the enclosed content may be left in the webpage 1304. However, if the requirements of the access filter are not met, the access filter tags may be removed along with any enclosed content therein. The webpage code 114 can then be sent to the user's web browser 116 with all of the filter content and access filter tags removed. Therefore, the web browser 116 will have no indication that any content was removed from the webpage code 114.

Figure 14:
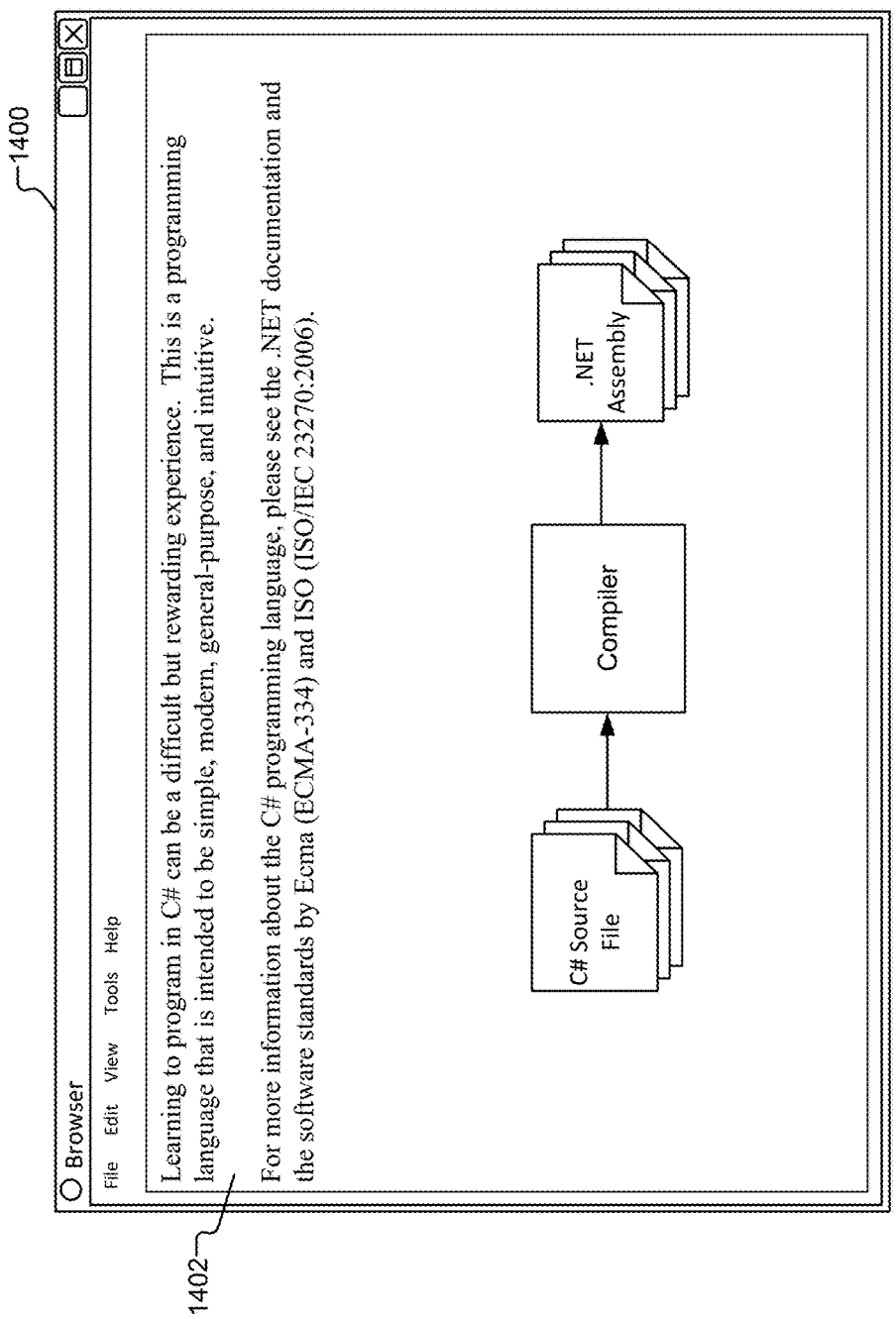
FIG. 14 illustrates a webpage rendered by a client device web browser with content filtered at the server, according to one embodiment.

FIG. 14 illustrates a webpage 1402 rendered by a client device web browser 1400 with content filtered at the server, according to one embodiment. In this example, it can be assumed that the requirements of at least one of the access filters was not met. Specifically, webpage 1402 may be a filtered version of the webpage shown in FIG. 9 in the standard view of the editor. The requirements of the second access filter 902 and a third access filter 906 have been met because the associated text and graphical images have been included in the webpage 1402 as rendered by the web browser 1400. On the other hand, the content protected by the first access filter 904 has been removed.

Figure 15:
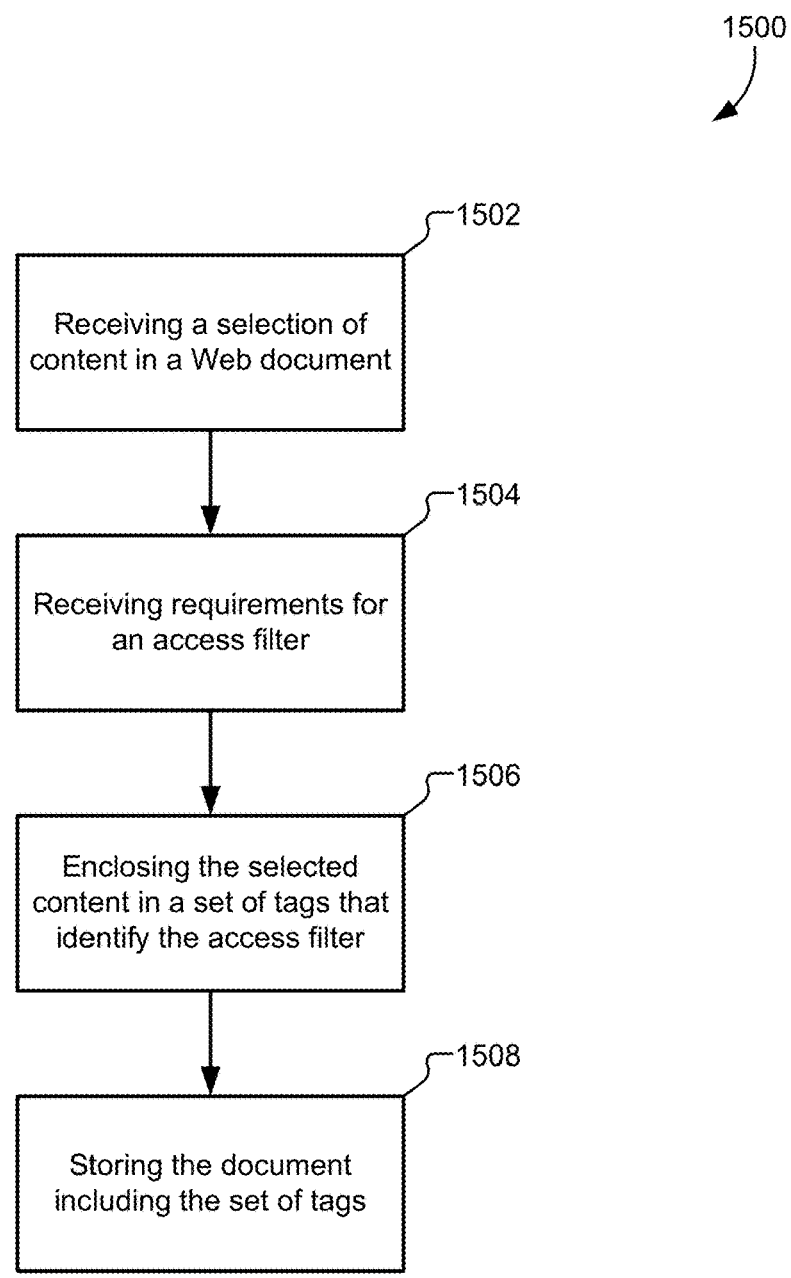
FIG. 15 illustrates a flowchart of a method for inserting access filters into web content, according to one embodiment.

FIG. 15 illustrates a flowchart 1500 of a method for inserting access filters into web content, according to one embodiment. The method of flowchart 1500 is a general version of the methods described above to insert access filters using the exemplary webpage editor of FIGS. 2-12. The method may include displaying the web content in a web design interface, such as the webpage editor described above, and receiving a selection of content in a web document (1502). The selection may occur in either a standard view or a code view of the webpage editor. The selected content may include a selection of code, such as a widget, plain text, graphics, static and/or dynamic content, and/or the like.

The method may also include receiving requirements for an access filter (1504). As described in detail above, the access filter requirements may include requirements for user attributes, session attributes, client device attributes, geographic/time attributes, group membership attributes, and so forth. The method may further include enclosing the selected content in a set of tags that identify the access filter (1506). The set of tags may be, for example, a set of HTML tags. The set of tags may also include code for displaying a graphical container that encapsulates the selected content in a standard view of the webpage editor. The set of tags may also include a reference to the access filter and/or the access filter requirements. Multiple access filters may be placed on the same page, and multiple access filters may be instantiated in a hierarchical fashion.

It should be appreciated that the specific steps illustrated in FIG. 15 provide particular methods of inserting access filters according to various embodiments of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
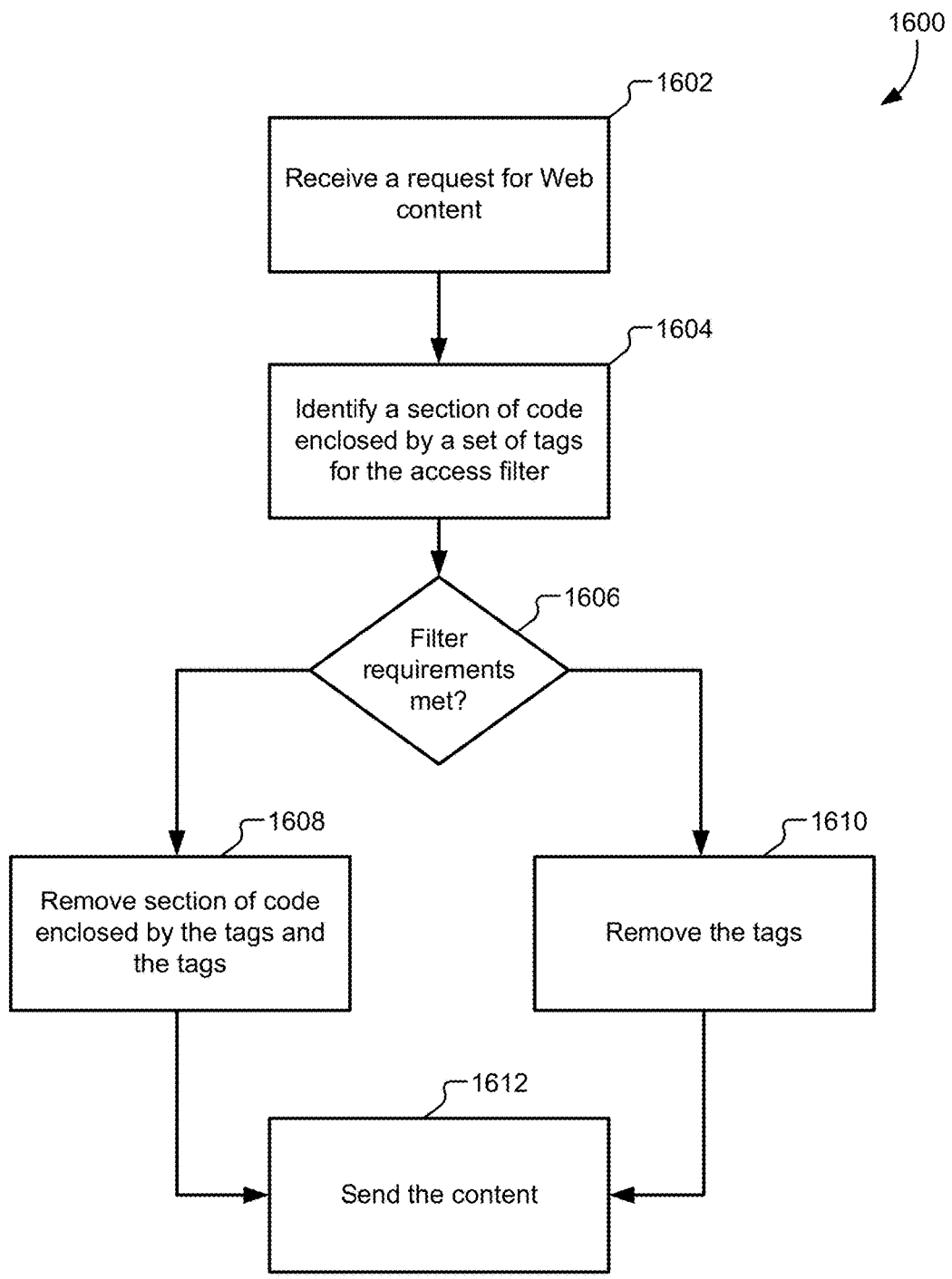
FIG. 16 illustrates a flowchart of a method for server-side filtering of web content, according to one embodiment.

FIG. 16 illustrates a flowchart 1600 of a method for server-side filtering of web content, according to one embodiment. The method may include receiving a request for code for displaying web content (1602). The request may be received from a client device, and the request may be associated with one or more attributes, which may be referred to as request attributes. The attributes may include user attributes, session attributes, client device attributes, and so forth. The method may also include identifying a section of code enclosed by a set of tags (1604). The set of tags may specify minimum requirements for accessing the section of code. The method may additionally include determining whether the one or more attributes associated with the request meet the requirements for accessing the section of code (1606). If the requirements are met, the set of tags can be removed (1610). If the requirements are not met, the section of code and the set of tags may both be removed (1608). The method may also include sending the code for displaying the web content to the client device, with or without the section of code removed, depending on whether the filter requirements were met (1612).

It should be appreciated that the specific steps illustrated in FIG. 16 provide particular methods of performing server-side content filtering according to various embodiments of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 17:
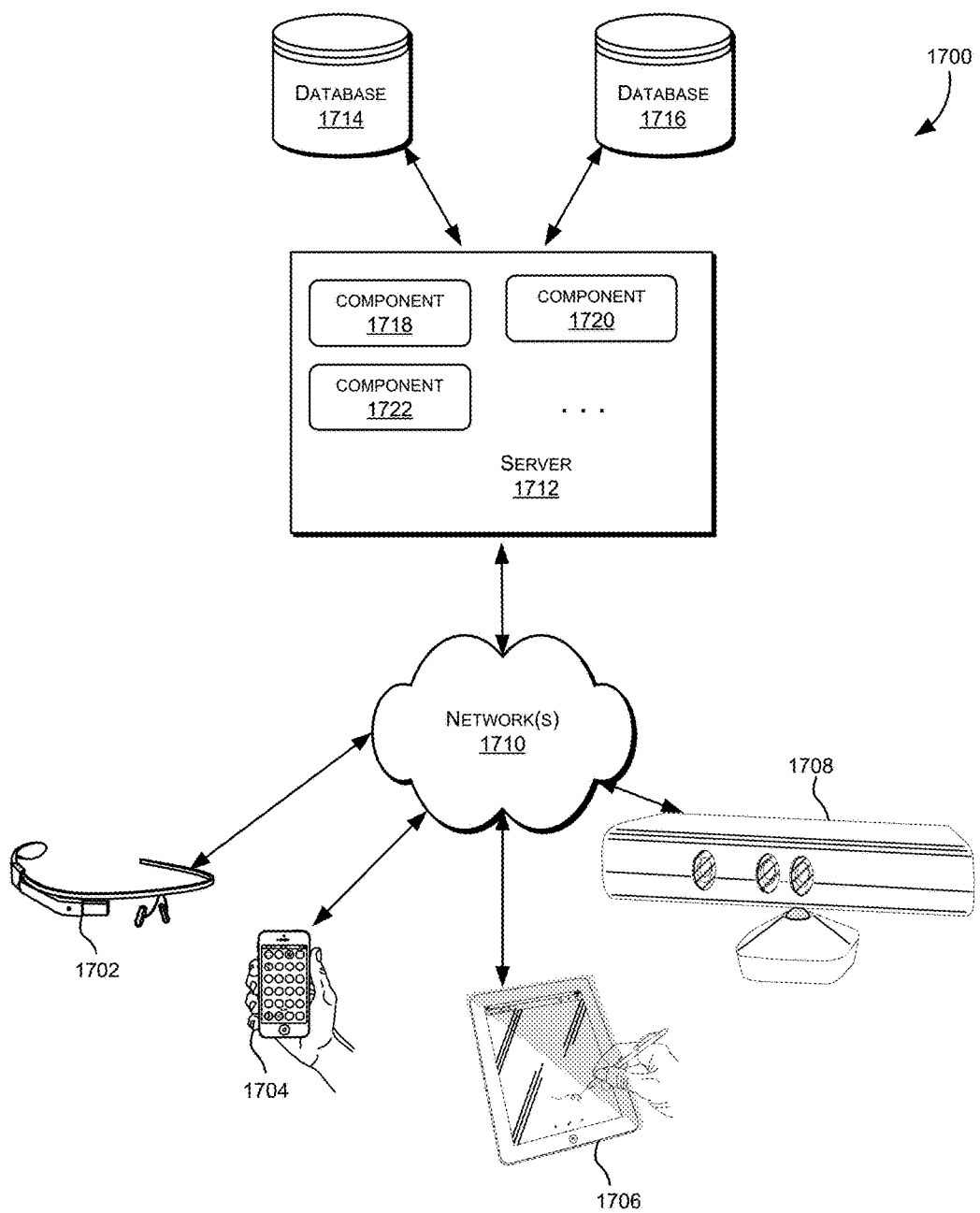
FIG. 17 illustrates a simplified block diagram of a distributed system for implementing some of the embodiments.

FIG. 17 depicts a simplified diagram of a distributed system 1700 for implementing one of the embodiments. In the illustrated embodiment, distributed system 1700 includes one or more client computing devices 1702, 1704, 1706, and 1708, which are configured to execute and operate a client application such as a web browser, proprietary client (e.g., Oracle Forms), or the like over one or more network(s) 1710. Server 1712 may be communicatively coupled with remote client computing devices 1702, 1704, 1706, and 1708 via network 1710.

In various embodiments, server 1712 may be adapted to run one or more services or software applications provided by one or more of the components of the system. In some embodiments, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in the figure, the software components 1718, 1720 and 1722 of system 1700 are shown as being implemented on server 1712. In other embodiments, one or more of the components of system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The embodiment shown in the figure is thus one example of a distributed system for implementing an embodiment system and is not intended to be limiting.

Client computing devices 1702, 1704, 1706, and/or 1708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1702, 1704, 1706, and 1708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1710.

Although exemplary distributed system 1700 is shown with four client computing devices, any number of client computing devices may be supported. Other devices, such as devices with sensors, etc., may interact with server 1712.

Network(s) 1710 in distributed system 1700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1710 can be a local area network (LAN), such as one based on Ethernet, Token-Ring and/or the like. Network(s) 1710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1712 may be adapted to run one or more services or software applications described in the foregoing disclosure. For example, server 1712 may correspond to a server for performing processing described above according to an embodiment of the present disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more databases 1714 and 1716. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of embodiments, databases 1714 and 1716 may reside in a storage-area network (SAN). Similarly, any necessary files for performing the functions attributed to server 1712 may be stored locally on server 1712 and/or remotely, as appropriate. In one set of embodiments, databases 1714 and 1716 may include relational databases, such as databases provided by Oracle, that are adapted to store, update, and retrieve data in response to SQL-formatted commands.

Figure 18:
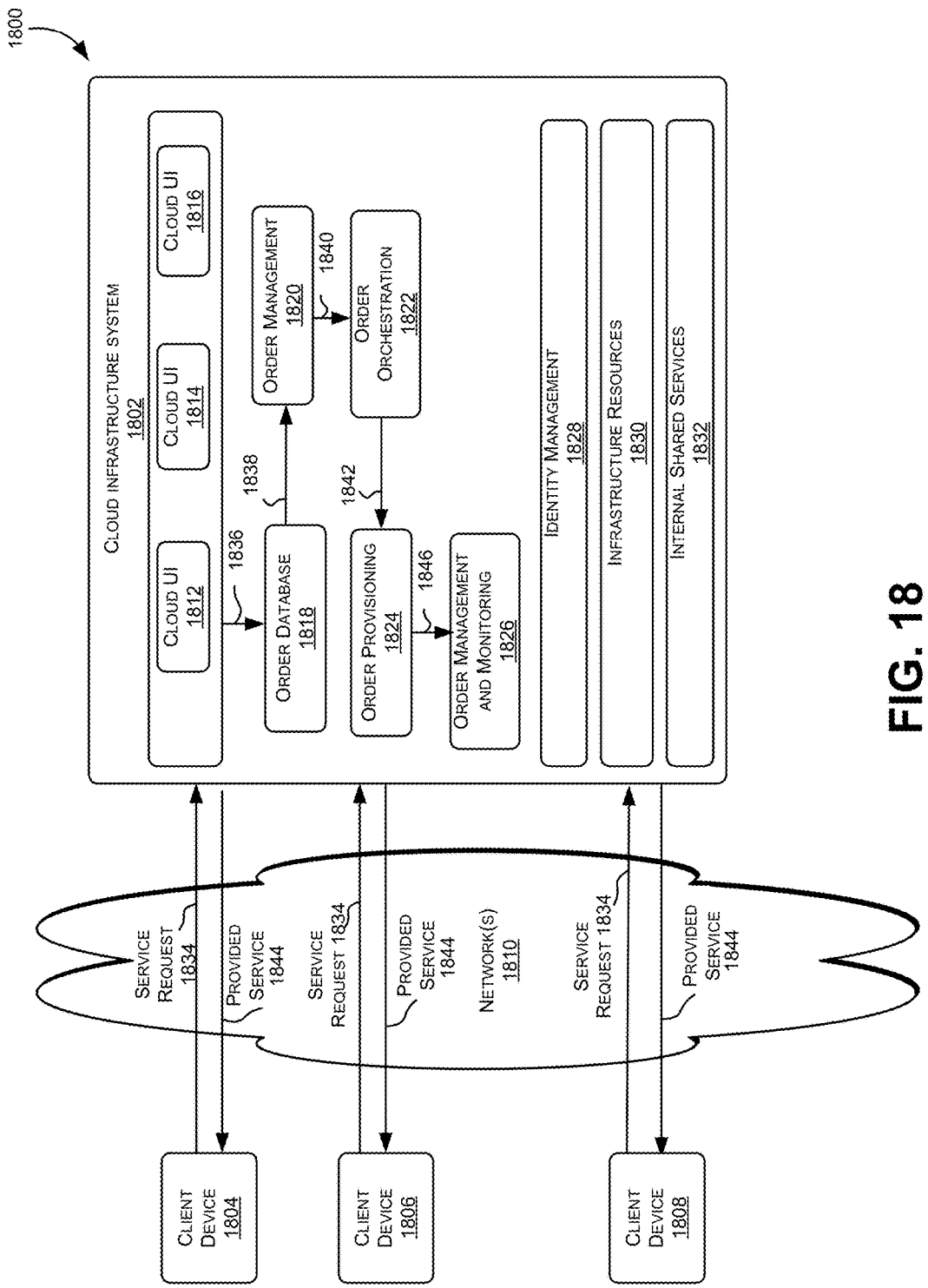
FIG. 18 illustrates a simplified block diagram of components of a system environment by which services provided by the components of an embodiment system may be offered as cloud services.

FIG. 18 is a simplified block diagram of one or more components of a system environment 1800 by which services provided by one or more components of an embodiment system may be offered as cloud services, in accordance with an embodiment of the present disclosure. In the illustrated embodiment, system environment 1800 includes one or more client computing devices 1804, 1806, and 1808 that may be used by users to interact with a cloud infrastructure system 1802 that provides cloud services. The client computing devices may be configured to operate a client application such as a web browser, a proprietary client application (e.g., Oracle Forms), or some other application, which may be used by a user of the client computing device to interact with cloud infrastructure system 1802 to use services provided by cloud infrastructure system 1802.

It should be appreciated that cloud infrastructure system 1802 depicted in the figure may have other components than those depicted. Further, the embodiment shown in the figure is only one example of a cloud infrastructure system that may incorporate an embodiment of the invention. In some other embodiments, cloud infrastructure system 1802 may have more or fewer components than shown in the figure, may combine two or more components, or may have a different configuration or arrangement of components.

Client computing devices 1804, 1806, and 1808 may be devices similar to those described above for 1702, 1704, 1706, and 1708.

Although exemplary system environment 1800 is shown with three client computing devices, any number of client computing devices may be supported. Other devices such as devices with sensors, etc. may interact with cloud infrastructure system 1802.

Network(s) 1810 may facilitate communications and exchange of data between clients 1804, 1806, and 1808 and cloud infrastructure system 1802. Each network may be any type of network familiar to those skilled in the art that can support data communications using any of a variety of commercially-available protocols, including those described above for network(s) 1710.

Cloud infrastructure system 1802 may comprise one or more computers and/or servers that may include those described above for server 1712.

In certain embodiments, services provided by the cloud infrastructure system may include a host of services that are made available to users of the cloud infrastructure system on demand, such as online data storage and backup solutions, web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1802 may be adapted to automatically provision, manage and track a customer's subscription to services offered by cloud infrastructure system 1802. Cloud infrastructure system 1802 may provide the cloud services via different deployment models. For example, services may be provided under a public cloud model in which cloud infrastructure system 1802 is owned by an organization selling cloud services (e.g., owned by Oracle) and the services are made available to the general public or different industry enterprises. As another example, services may be provided under a private cloud model in which cloud infrastructure system 1802 is operated solely for a single organization and may provide services for one or more entities within the organization. The cloud services may also be provided under a community cloud model in which cloud infrastructure system 1802 and the services provided by cloud infrastructure system 1802 are shared by several organizations in a related community.

The cloud services may also be provided under a hybrid cloud model, which is a combination of two or more different models.

In some embodiments, the services provided by cloud infrastructure system 1802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1802. Cloud infrastructure system 1802 then performs processing to provide the services in the customer's subscription order.

In some embodiments, the services provided by cloud infrastructure system 1802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1802 may also include infrastructure resources 1830 for providing the resources used to provide various services to customers of the cloud infrastructure system. In one embodiment, infrastructure resources 1830 may include pre-integrated and optimized combinations of hardware, such as servers, storage, and networking resources to execute the services provided by the PaaS platform and the SaaS platform.

In some embodiments, resources in cloud infrastructure system 1802 may be shared by multiple users and dynamically re-allocated per demand. Additionally, resources may be allocated to users in different time zones. For example, cloud infrastructure system 1830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1832 may be provided that are shared by different components or modules of cloud infrastructure system 1802 and by the services provided by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1802, and the like.

In one embodiment, as depicted in the figure, cloud management functionality may be provided by one or more modules, such as an order management module 1820, an order orchestration module 1822, an order provisioning module 1824, an order management and monitoring module 1826, and an identity management module 1828. These modules may include or be provided using one or more computers and/or servers, which may be general purpose computers, specialized server computers, server farms, server clusters, or any other appropriate arrangement and/or combination.

In exemplary operation 1834, a customer using a client device, such as client device 1804, 1806 or 1808, may interact with cloud infrastructure system 1802 by requesting one or more services provided by cloud infrastructure system 1802 and placing an order for a subscription for one or more services offered by cloud infrastructure system 1802. In certain embodiments, the customer may access a cloud User Interface (UI), cloud UI 1812, cloud UI 1814 and/or cloud UI 1816 and place a subscription order via these UIs. The order information received by cloud infrastructure system 1802 in response to the customer placing an order may include information identifying the customer and one or more services offered by the cloud infrastructure system 1802 that the customer intends to subscribe to.

After an order has been placed by the customer, the order information is received via the cloud UIs, 1812, 1814 and/or 1816.

At operation 1836, the order is stored in order database 1818. Order database 1818 can be one of several databases operated by cloud infrastructure system 1818 and operated in conjunction with other system elements.

At operation 1838, the order information is forwarded to an order management module 1820. In some instances, order management module 1820 may be configured to perform billing and accounting functions related to the order, such as verifying the order, and upon verification, booking the order.

At operation 1840, information regarding the order is communicated to an order orchestration module 1822. Order orchestration module 1822 may utilize the order information to orchestrate the provisioning of services and resources for the order placed by the customer. In some instances, order orchestration module 1822 may orchestrate the provisioning of resources to support the subscribed services using the services of order provisioning module 1824.

In certain embodiments, order orchestration module 1822 enables the management of business processes associated with each order and applies business logic to determine whether an order should proceed to provisioning. At operation 1842, upon receiving an order for a new subscription, order orchestration module 1822 sends a request to order provisioning module 1824 to allocate resources and configure those resources needed to fulfill the subscription order. Order provisioning module 1824 enables the allocation of resources for the services ordered by the customer. Order provisioning module 1824 provides a level of abstraction between the cloud services provided by cloud infrastructure system 1800 and the physical implementation layer that is used to provision the resources for providing the requested services. Order orchestration module 1822 may thus be isolated from implementation details, such as whether or not services and resources are actually provisioned on the fly or pre-provisioned and only allocated/assigned upon request.

At operation 1844, once the services and resources are provisioned, a notification of the provided service may be sent to customers on client devices 1804, 1806 and/or 1808 by order provisioning module 1824 of cloud infrastructure system 1802.

At operation 1846, the customer's subscription order may be managed and tracked by an order management and monitoring module 1826. In some instances, order management and monitoring module 1826 may be configured to collect usage statistics for the services in the subscription order, such as the amount of storage used, the amount data transferred, the number of users, and the amount of system up time and system down time.

In certain embodiments, cloud infrastructure system 1800 may include an identity management module 1828. Identity management module 1828 may be configured to provide identity services, such as access management and authorization services in cloud infrastructure system 1800. In some embodiments, identity management module 1828 may control information about customers who wish to utilize the services provided by cloud infrastructure system 1802. Such information can include information that authenticates the identities of such customers and information that describes which actions those customers are authorized to perform relative to various system resources (e.g., files, directories, applications, communication ports, memory segments, etc.) Identity management module 1828 may also include the management of descriptive information about each customer and about how and by whom that descriptive information can be accessed and modified.

Figure 19:
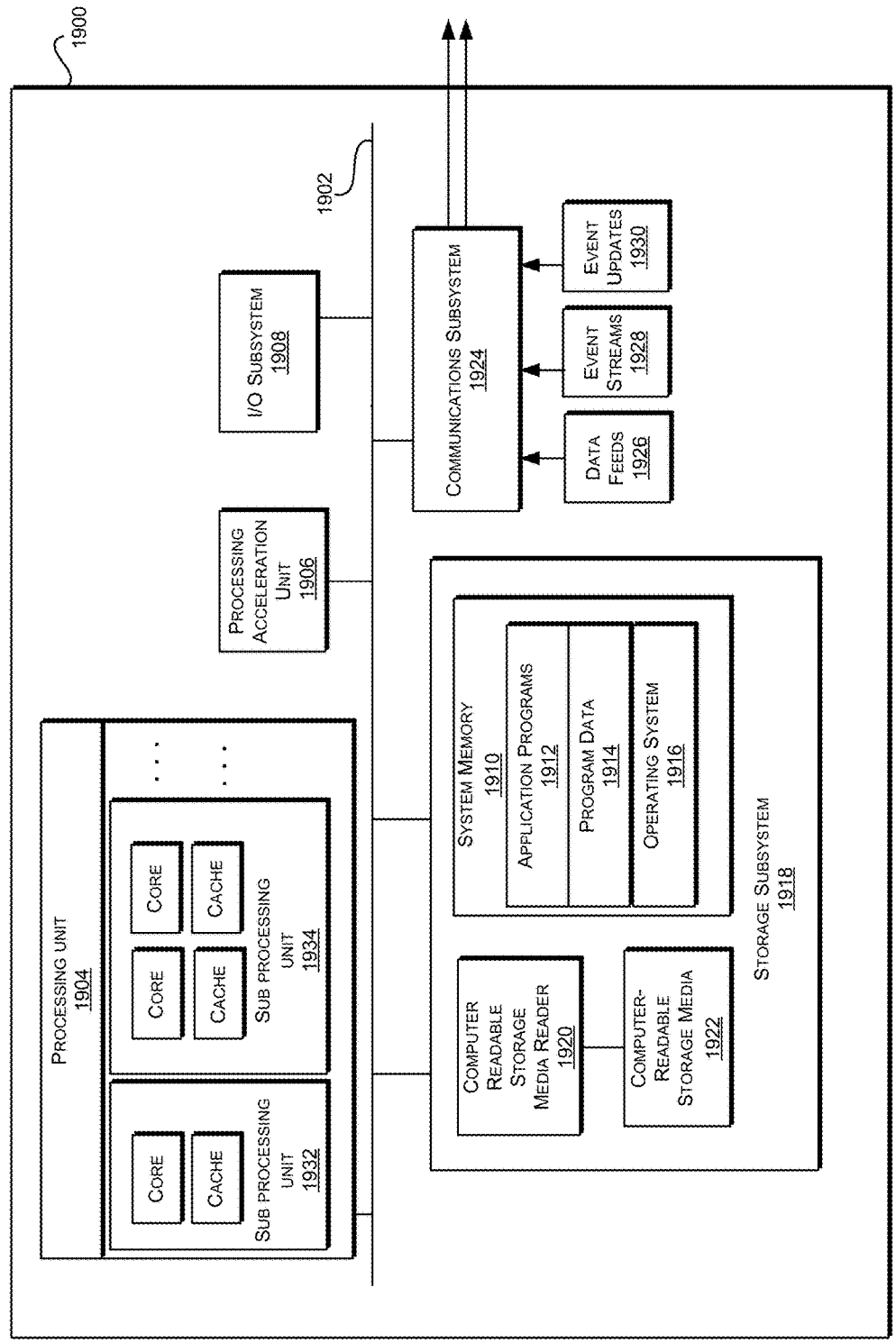
FIG. 19 illustrates an exemplary computer system, in which various embodiments may be implemented.

FIG. 19 illustrates an exemplary computer system 1900, in which various embodiments of the present invention may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1918 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present invention.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of filtering web content, the method comprising:
   receiving, at a web server that hosts web content, a request from a client device for code for displaying the web content, wherein the request is associated with one or more attributes;
   identifying, by the web server,
      (i) a first section of the code that is enclosed by a first set of tags, wherein code within the first set of tags specifies to the web server first requirements for accessing the first section of the code enclosed by the first set of tags, and
      (ii) a second section of the code that is enclosed by a second set of tags, wherein code within the second set of tags specifies to the web server second requirements for accessing the second section of the code enclosed by the second set of tags, wherein the second requirements are different from the first requirements;
   determining, by the web server, that the one or more attributes associated with the request
      (i) do not meet the requirements specified within the first set of tags for accessing the first section of the code enclosed by the first set of tags, and
      (ii) do meet the second requirements specified within the second set of tags for accessing the second section of the code enclosed by the second set of tags;
   generating a filtered code for displaying the web content by:
      (i) based on the determination that the one or more attributes do not meet the requirements specified within the first set of tags, removing, by the web server, the first section of the code enclosed by the first set of tags from the code for displaying the web content, and
      (ii) based on the determination that the one or more attributes do meet the requirements specified by the second set of tags, removing, by the web server, the second set of tags, but not the second section of code, from the code for displaying the web content; and
   sending, from the web server, the filtered code for displaying the web content to the client device.

2. The method of claim 1, further comprising:
   receiving a second request from a second client device for the code for displaying the web content, wherein the second request is associated with second one or more attributes;
   determining that the second one or more attributes associated with the second request do meet the requirements for accessing the first section of the code; and
   sending the code for displaying the web content to the second client device with the first section of the code enclosed by the first set of tags.

3. The method of claim 1, further comprising, prior to receiving the request:
   displaying the web content in a web design interface;
   receiving a selection of the first section of the code through the web design interface;
   receiving the requirements for accessing the first section of the code through the web design interface; and
   automatically inserting the first set of tags around the first section of the code.

4. The method of claim 1, wherein either the first section of the code or the second section of the code comprises a reference to a dynamic widget.

5. The method of claim 1, wherein either the first section of the code or the second section of the code comprises text to be displayed as part of the web content.

6. The method of claim 1, wherein the first and second set of tags comprise HyperText Markup Language (HTML) tags.

7. The method of claim 1, further comprising:
   identifying a third section of the code that is enclosed by a third set of tags that specify third requirements for accessing the third section of the code, wherein the first section of the code is also enclosed by the third set of tags; and
   determining that the one or more attributes associated with the request do meet the third requirements for accessing the third section of the code, wherein the filtered code for displaying the web content sent to the client device includes the third section of the code.

8. The method of claim 1, wherein the removing further comprises removing the first set of tags from the code for displaying the web content when generating the filtered code for displaying the web content.

9. The method of claim 1, wherein the one or more attributes associated with the request comprises a user group to which a user of the client device belongs.

10. The method of claim 1, wherein the one or more attributes associated with the request comprises a geographic location from which the request is received.

11. The method of claim 1, wherein the one or more attributes associated with the request comprises security attributes assigned to a user of the client device.

12. A non-transitory, computer-readable medium comprising instructions that, when executed by one or more processors, causes the one or more processors to perform operations comprising:
   receiving, at a web server that hosts web content, a request from a client device for code for displaying the web content, wherein the request is associated with one or more attributes;
   identifying, by the web server,
      (i) a first section of the code that is enclosed by a first set of tags, wherein code within the first set of tags specifies to the web server first requirements for accessing the first section of the code enclosed by the first set of tags, and (ii) a second section of the code that is enclosed by a second set of tags, wherein code within the second set of tags specifies to the web server second requirements for accessing the second section of the code enclosed by the second set of tags, wherein the second requirements are different from the first requirements;

determining, by the web server, that the one or more attributes associated with the request
(i) do not meet the requirements specified within the first set of tags for accessing the first section of the code enclosed by the first set of tags, and
(ii) do meet the second requirements specified within the second set of tags for accessing the second section of the code enclosed by the second set of tags;

generating a filtered code for displaying the web content by:
(i) based on the determination that the one or more attributes do not meet the requirements specified within the first set of tags, removing, by the web server, the first section of the code enclosed by the first set of tags from the code for displaying the web content, and
(ii) based on the determination that the one or more attributes do meet the requirements specified by the second set of tags, removing, by the web server, the second set of tags, but not the second section of code, from the code for displaying the web content; and sending, from the web server, the filtered code for displaying the web content to the client device.

13. The non-transitory, computer-readable medium according to claim 12 comprising additional instruction that cause the one or more processors to perform additional operations comprising:
receiving a second request from a second client device for the code for displaying the web content, wherein the second request is associated with second one or more attributes;
determining that the second one or more attributes associated with the second request do meet the requirements for accessing the first section of the code; and
sending the code for displaying the web content to the second client device with the first section of the code enclosed by the first set of tags.

14. The non-transitory, computer-readable medium according to claim 12 comprising additional instruction that cause the one or more processors to perform additional operations comprising:
prior to receiving the request:
displaying the web content in a web design interface;
receiving a selection of the first section of the code through the web design interface;
receiving the requirements for accessing the first section of the code through the web design interface; and
automatically inserting the first set of tags around the first section of the code.

15. The non-transitory, computer-readable medium according to claim 12 wherein:
either the first section of the code or the second section of the code comprises text to be displayed as part of the web content; and
the first and second set of tags comprise HyperText Markup Language (HTML) tags.

16. The non-transitory, computer-readable medium according to claim 12 comprising additional instruction that cause the one or more processors to perform additional operations comprising:
identifying a third section of the code that is enclosed by a third set of tags that specify third requirements for accessing the third section of the code, wherein the first section of the code is also enclosed by the third set of tags; and
determining that the one or more attributes associated with the request do meet the third requirements for accessing the third section of the code, wherein the code for displaying the web content is sent to the client device with the third section of the code.

17. A system comprising:
one or more processors; and
one or more memory devices comprising instructions that, when executed by the one or more processors, cause the one or more processors to perform operations comprising:
receiving, at a web server that hosts web content, a request from a client device for code for displaying the web content, wherein the request is associated with one or more attributes;
identifying, by the web server,
(i) a first section of the code that is enclosed by a first set of tags, wherein code within the first set of tags specifies to the web server first requirements for accessing the first section of the code enclosed by the first set of tags, and
(ii) a second section of the code that is enclosed by a second set of tags, wherein code within the second set of tags specifies to the web server second requirements for accessing the second section of the code enclosed by the second set of tags, wherein the second requirements are different from the first requirements;
determining, by the web server, that the one or more attributes associated with the request
(i) do not meet the requirements specified within the first set of tags for accessing the first section of the code enclosed by the first set of tags, and
(ii) do meet the second requirements specified within the second set of tags for accessing the second section of the code enclosed by the second set of tags;
generating a filtered code for displaying the web content by:
(i) based on the determination that the one or more attributes do not meet the requirements specified within the first set of tags, removing, by the web server, the first section of the code enclosed by the first set of tags from the code for displaying the web content, and
(ii) based on the determination that the one or more attributes do meet the requirements specified by the second set of tags, removing, by the web server, the second set of tags, but not the second section of code, from the code for displaying the web content; and
sending, from the web server, the filtered code for displaying the web content to the client device.

18. The system of claim 17, wherein the one or more memory devices further comprise additional instructions that cause the one or more processors to perform additional operations comprising:

receiving a second request from a second client device for the code for displaying the web content, wherein the second request is associated with second one or more attributes;

determining that the second one or more attributes associated with the second request do meet the requirements for accessing the first section of the code; and sending the code for displaying the web content to the second client device with the first section of the code enclosed by the first set of tags.

19. The system of claim 17, wherein the one or more memory devices further comprise additional instructions that cause the one or more processors to perform additional operations comprising:

prior to receiving the request:

displaying the web content in a web design interface;

receiving a selection of the first section of the code through the web design interface;

receiving the requirements for accessing the first section of the code through the web design interface; and automatically inserting the first set of tags around the first section of the code.

20. The system of claim 17 wherein:

either the first section of the code or the second section of the code comprises text to be displayed as part of the web content; and the first and second set of tags comprise HyperText Markup Language (HTML) tags.

* * * * *